(12) United States Patent
Itou

(10) Patent No.: US 8,970,892 B2
(45) Date of Patent: Mar. 3, 2015

(54) MEMORY CONTROL DEVICE AND IMAGE FORMING APPARATUS

(71) Applicant: Konica Minolta, Inc., Chiyoda-ku, Tokyo (JP)

(72) Inventor: Jun Itou, Hino-shi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/207,168

(22) Filed: Mar. 12, 2014

(65) Prior Publication Data

US 2014/0268253 A1 Sep. 18, 2014

(30) Foreign Application Priority Data

Mar. 13, 2013 (JP) ................................. 2013-050738

(51) Int. Cl.
*H04N 1/04* (2006.01)
*H04N 1/21* (2006.01)

(52) U.S. Cl.
CPC ........................................ *H04N 1/21* (2013.01)
USPC ........................... 358/1.16; 358/1.15; 358/1.9

(58) Field of Classification Search
USPC ............................... 358/1.16, 1.9, 1.15
See application file for complete search history.

(56) References Cited

U.S. PATENT DOCUMENTS

2012/0246361 A1 * 9/2012 Tsuchida et al. ................ 710/65

FOREIGN PATENT DOCUMENTS

| JP | 2009-135887 A | 6/2009 |
| JP | 2010-205002 A | 9/2010 |

* cited by examiner

*Primary Examiner* — Houshang Safaipour
(74) *Attorney, Agent, or Firm* — Holtz, Holtz, Goodman & Chick PC

(57) ABSTRACT

Disclosed is a memory control device, including: an address mapping unit configured to assign a main scanning address and a sub-scanning address to a column address, a row address and a bank address of an SDRAM, to assign lower N bit(s) (N is a positive integer) for indicating an address corresponding to a burst size of a burst transfer among the main scanning address, to lower bit(s) of the column address, and to assign predetermined number of bit(s) arranged successively to an upper bit side of the lower N bit(s) among the main scanning address, to the bank address; and an access executing unit configured to read or write one line of image data in the main scanning direction by carrying out the burst transfer successively multiple times in a multibank operation while the sub-scanning address is changed at an end of the burst transfer.

12 Claims, 24 Drawing Sheets

FIG.9

| ORIGINAL IMAGE | VV_CNT[14:0] (SUB-SCANNING ADDRESS) | | | | HV_CNT[12:0] (MAIN SCANNING ADDRESS) | | | 1'b0 |
|---|---|---|---|---|---|---|---|---|
| | 14 | 13 | 12  3 | 2  0 | 12  10 | 9 | 0 | |
| | 28 | 27 | 26  17 | 16  14 | 13  11 | 10  1 | | 0 |
| DDR | Don't Care | Chip select | Row[12:3] | Bank[2:0] | Row[2:0] | Column[9:0] | | data path |

FIG.10

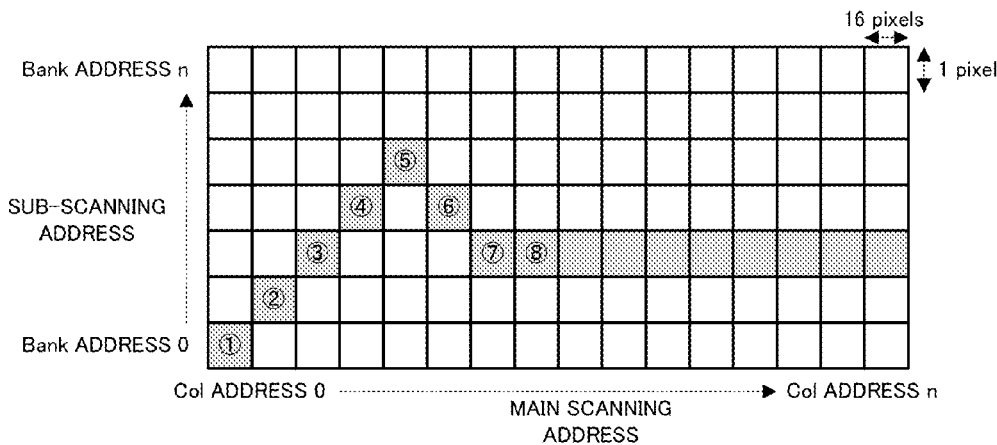

① In Row address 13'h0000, Col address 10'h000, Bank address 3'h0, BURST WRITING OF 16×1 pixels DATA ② In Row address 13'h0000, Col address 10'h004, Bank address 3'h1, BURST WRITING OF 16×1 pixels DATA ③ In Row address 13'h0000, Col address 10'h008, Bank address 3'h2, BURST WRITING OF 16×1 pixels DATA ④ In Row address 13'h0000, Col address 10'h00C, Bank address 3'h3, BURST WRITING OF 16×1 pixels DATA ⑤ In Row address 13'h0000, Col address 10'h010, Bank address 3'h4, BURST WRITING OF 16×1 pixels DATA ⑥ In Row address 13'h0000, Col address 10'h014, Bank address 3'h3, BURST WRITING OF 16×1 pixels DATA ⑦ In Row address 13'h0000, Col address 10'h018, Bank address 3'h2, BURST WRITING OF 16×1 pixels DATA ⑧ In Row address 13'h0000, Col address 10'h01C, Bank address 3'h2, BURST WRITING OF 16×1 pixels DATA

BANK ADDRESS IS CHANGED IN ASSOCIATION WITH CHANGE OF SUB-SCANNING ADDRESS

FIG.12

| ORIGINAL IMAGE | VV_CNT[14:0] (SUB-SCANNING ADDRESS) | | | HV_CNT[12:0] (MAIN SCANNING ADDRESS) | | | | 1'b0 |
|---|---|---|---|---|---|---|---|---|
| | 14 | 13 | 12 ... 0 | 12 ... 5 | 4 ... 2 | 1 ... 0 | | |
| | 28 | 27 | 26 ... 14 | 13 ... 6 | 5 ... 3 | 2 ... 1 | 0 | |
| DDR | Don't Care | Chip select | Row[12:0] | Column [9:2] | Bank[2:0] | Column [1:0] | data path | |

FIG.13

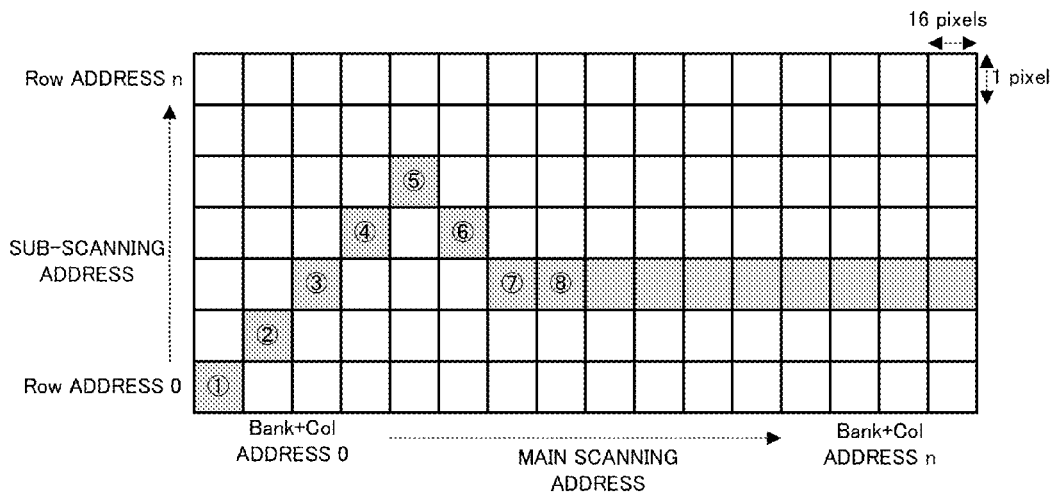

① In Row address 13'h0000, Col address 10'h000, Bank address 3'h0, BURST WRITING OF 16x1 pixels DATA ② In Row address 13'h0001, Col address 10'h000, Bank address 3'h1, BURST WRITING OF 16x1 pixels DATA ③ In Row address 13'h0002, Col address 10'h000, Bank address 3'h2, BURST WRITING OF 16x1 pixels DATA ④ In Row address 13'h0003, Col address 10'h000, Bank address 3'h3, BURST WRITING OF 16x1 pixels DATA ⑤ In Row address 13'h0004, Col address 10'h000, Bank address 3'h4, BURST WRITING OF 16x1 pixels DATA ⑥ In Row address 13'h0003, Col address 10'h000, Bank address 3'h5, BURST WRITING OF 16x1 pixels DATA ⑦ In Row address 13'h0002, Col address 10'h000, Bank address 3'h6, BURST WRITING OF 16x1 pixels DATA ⑧ In Row address 13'h0002, Col address 10'h000, Bank address 3'h7, BURST WRITING OF 16x1 pixels DATA

ROW ADDRESS IS CHANGED IN ASSOCIATION WITH SHIFT IN SUB-SCANNING DIRECTION

BANK ADDRESS IS CHANGED IN EVERY BURST WRITING

FIG.14

| ORIGINAL IMAGE | VV_CNT[14:0] (SUB-SCANNING ADDRESS) | | | | HV_CNT[12:0] (MAIN SCANNING ADDRESS) | | | | | | 1'b0 |
|---|---|---|---|---|---|---|---|---|---|---|---|
| | 14 | 13 | 12 | 0 | 12 11 | 10 9 | 6 5 | 4 3 | 0 | | |
| | 28 | 27 | 26 | 14 | 13 | | | | | 1 | 0 |
| DDR | Don't Care | Chip select | Row[12:0] | | Col [9:8] | Ba[2] | Col [7:4] | Ba [1:0] | Col [3:0] | | Data path |

FIG.16
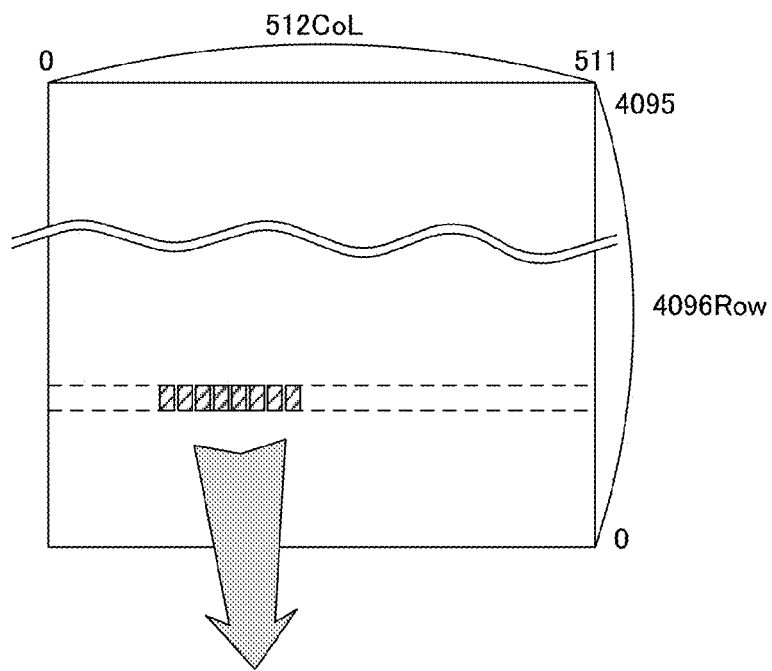
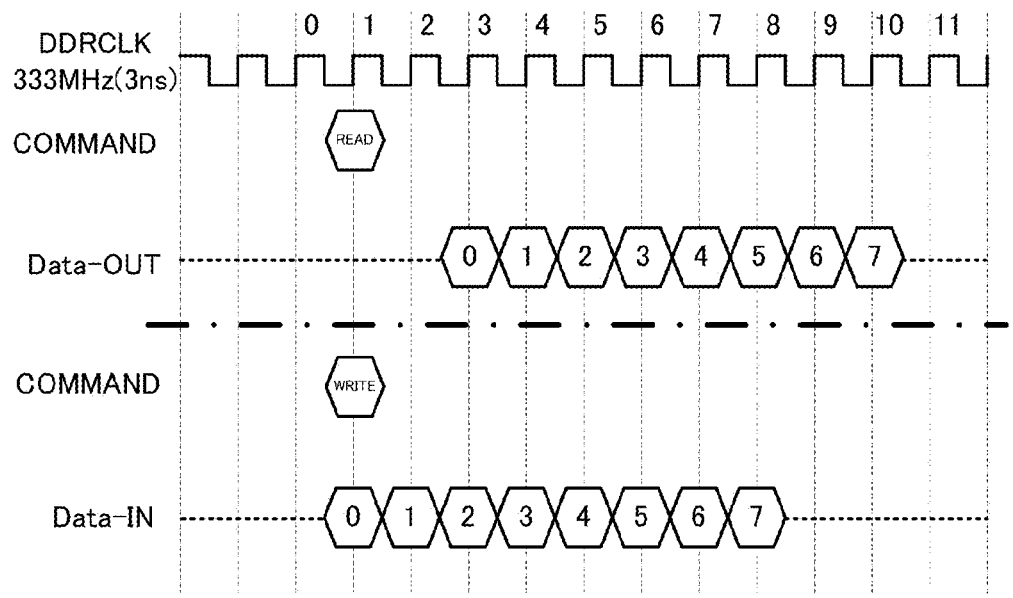

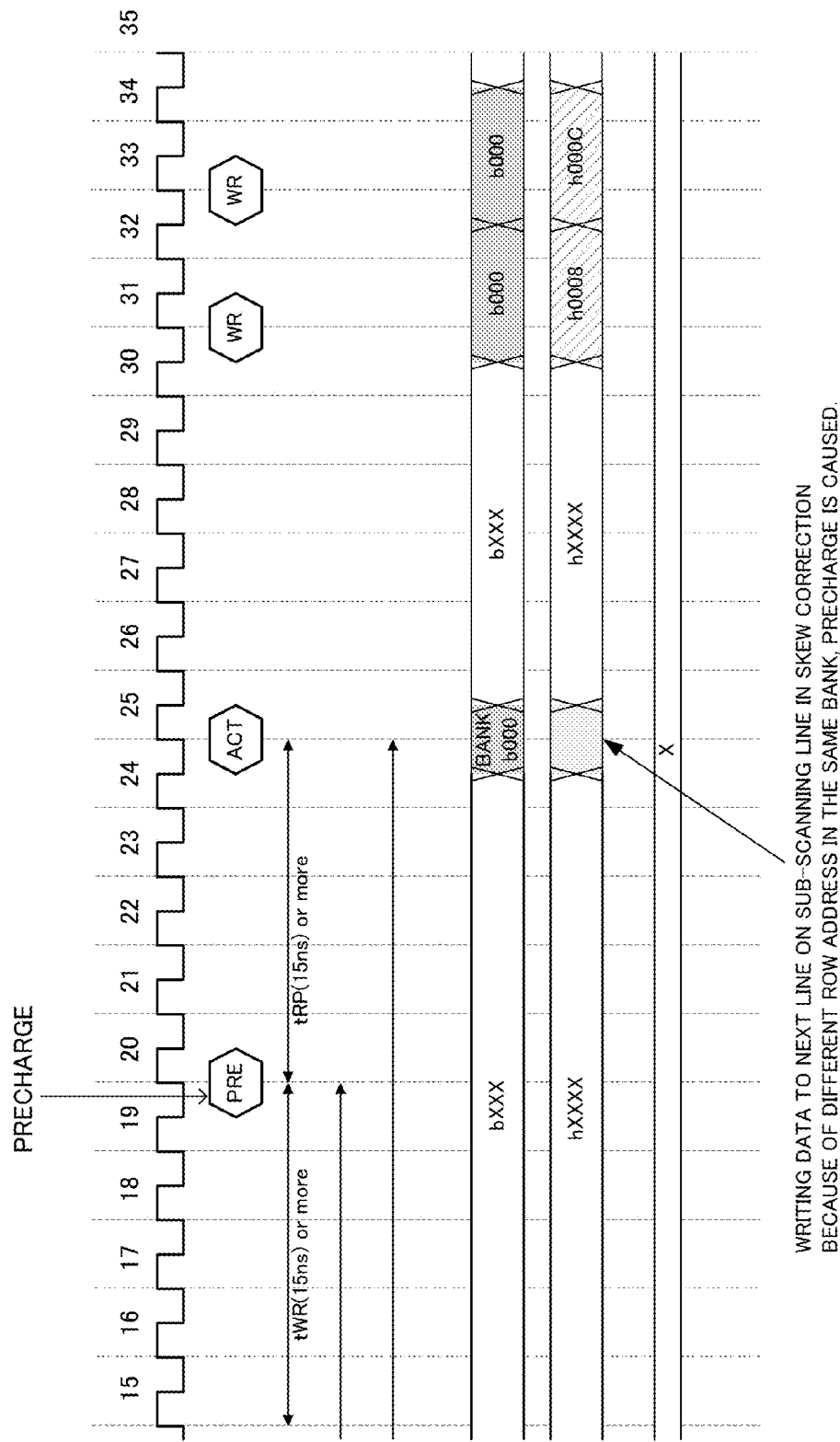

MEMORY CONTROL DEVICE AND IMAGE FORMING APPARATUS

BACKGROUND OF THE INVENTION

1. Field of the Invention

The present invention relates to a memory control device and an image forming apparatus which can correct the skew and/or the bow in an image when image data is transmitted via a memory.

2. Description of Related Art

In an image forming apparatus for outputting a two-dimensional image by repeating the image forming operation in the main scanning direction line by line while the image forming position is moved in the sub-scanning direction, the state in which the sub-scanning direction which is the conveying direction of the recording sheet is perpendicular to the main scanning direction which is the scanning direction of the exposure device or the like is the correct state. However, it is difficult that the sub-scanning direction is strictly perpendicular to the main scanning direction because of the mechanical accuracy, the assembly accuracy and the like. Therefore, the skew in which the image is slightly skewed in the sub-scanning direction and the bow in which the image is slightly bowed in the sub-scanning direction are caused.

FIGS. 15A and 15B show the example in which the skew is corrected by the image processing. FIG. 15A shows the case in which the output image is not corrected. In this example, because the scanning direction of the image forming unit is inclined (skewed) obliquely right upward with respect to the shaft direction of the photoconductive drum, the output image is skewed obliquely right upward. FIG. 15B shows the process for correcting the image by the image processing. When the original image 500 is written in the image memory, the image (each line) is obliquely inclined so as to cancel the skew caused in the image forming unit and is written (See dashed line A in FIG. 15B). When the image data is read out, each line of the image data is read as usual along the main scanning direction. In order to incline the image obliquely on the image memory as described above, the writing position of each pixel is shifted in the sub-scanning direction.

When the DDR-SDRAM (Double-Data-Rate Synchronous Dynamic Random Access Memory) is used as the image memory, the burst transfer is used in order to speed up the processing. FIG. 16 shows the operation timing of the DDR-SDRAM in the burst transfer in case that the burst length is set to "8". As shown in FIG. 16, by inputting the read command or the write command once, the data having 8 columns can be successively read or written. The burst transfer can be carried out only in the column address direction. The burst transfer is not compatible with the row address or the bank address.

Therefore, in general, the main scanning address indicating the pixel position in the main scanning direction on the original image is assigned to the column address of the memory. The sub-scanning address indicating the pixel position in the sub-scanning direction on the original image is assigned to the row address of the memory. Then, the writing and reading of one line of the image data in the main scanning direction is carried out by the burst transfer in which the column address is successively changed while the row address is fixed.

FIG. 17 shows the address mapping in which the sub-scanning address of the image is assigned to the row address of the SDRAM, the lower 10 bits of the main scanning address are assigned to the column address and the higher 3 bits of the main scanning address are assigned to the bank address. FIG. 18 shows the situation in which one line of the image data in the main scanning direction is written without changing the sub-scanning address (pixel position in the sub-scanning direction) according to the address mapping shown in FIG. 17. Each block (one box) shown in FIG. 18 is equivalent to the rectangular area having one pixel in the sub-scanning direction and 32 pixels in the main scanning direction. The above block indicates the minimum unit of the one-time burst transfer. In this example, one line of the image data in the main scanning direction is written by carrying out the burst transfer n times.

In case that by using the address mapping of FIG. 17, one line of the image data in the main scanning direction is written while the sub-scanning address is fixed, the row address designated for the memory is not changed while one line of the image data in the main scanning direction is written. When the row address is not changed, the overhead, for example, the precharge, is not caused between the finish of the current burst transfer and the starting of the next burst transfer. Therefore, by successively carrying out the burst transfer n times, one line of the image data in the main scanning direction can be read and written for a short time.

FIGS. 19A and 19B show the timing chart which indicates the activating timing of the memory in case that one line of the image data in the main scanning direction is written in the SDRAM without changing the sub-scanning address as shown in FIG. 18. Because the row address is not changed, by outputting the ACT (active) command at once when the writing of one line of the image data is started, the burst transfer can be successively carried out until the writing of the line of the data is finished. The precharge is caused only at once when the writing of the line of the data is finished.

In case that the image is inclined in order to correct the skew and the like, as described above, the writing position of the memory must be shifted in the sub-scanning direction when one line of the original image in the main scanning direction is written. For example, in Japanese Patent Application Publication No. 2009-135887, the following image processing method is disclosed. In the disclosed image processing method, when one line of the original image in the main scanning direction is written, the number of the successive pixels to be written on the same line in the main scanning direction of the memory for writing the original image is calculated. Then, by setting the calculated number of the successive pixels to the burst length, the burst transfer is carried out.

FIG. 20 shows an example in which one line of the image data in the main scanning direction is written while the writing position is shifted in the sub-scanning direction at the end of the block. In case that the above writing is carried out by using the address mapping shown in FIG. 17, the row address designated for the memory is changed every when the writing position is changed in the sub-scanning direction. Because the precharge is necessary to change the row address, the overhead is caused between the current burst transfer and the next burst transfer. Therefore, the processing time which is necessary to write one line of the image data in the main scanning direction becomes long for the overhead. FIGS. 21A and 21B show the activating timing of the memory in the above case. When the writing position is changed in the sub-scanning direction in order to correct the skew and the like, the precharge is required. As a result, the overhead is caused.

In the tandem type of color laser printer, the toner image forming units for C (cyan), M (magenta) Y (yellow) and K (black), respectively, are arranged at the predetermined intervals along the annular intermediate transfer belt. By overlapping the toner images each of which is formed on the surface of the photoconductive drum of each toner image forming unit, on the intermediate transfer belt, a full color image is formed. Therefore, the time difference in the toner image forming timing in each toner image forming unit is caused according to the arrangement intervals between the photoconductive drums of the respective toner image forming units. In order to eliminate the time difference, an image memory (drum-interval delay memory) for temporarily storing the image data is provided on the front stage of each toner image forming unit, and the timing of reading out the image data is adjusted.

In the printer having the drum-interval delay memories, the skew correction and the bow correction can be carried out at the same time when the image data is transmitted via the drum-interval delay memory. However, the time for writing the image data in the drum-interval delay memory and reading the image data from the drum-interval delay memory is limited to a finite period of time in order to ensure the performance of the printer. Therefore, in case that the skew/bow correction is carried out by using the above address mapping in which it is necessary to change the row address designated for the memory every when the reading and writing position is changed in the sub-scanning direction, in order to write and read the image data within the above finite period of time, the number of times the row address is changed is decreased. That is, in order to write and read the image data within the above finite period of time, it is necessary to lengthen the minimum burst length which is the minimum unit of the burst transfer and to decrease the number of times of the burst transfer. However, in case that the minimum burst length is lengthened, the problem in which the skew/bow correction cannot be precisely carried out is caused.

SUMMARY

To achieve at least one of the abovementioned objects, a memory control device reflecting one aspect of the present invention comprises:

an address mapping unit configured to assign a main scanning address indicating a pixel position in a main scanning direction of a two-dimensional image in which pixels are arranged in the main scanning direction and in a sub-scanning direction which is perpendicular to the main scanning direction in a matrix form, and a sub-scanning address indicating the pixel position in the sub-scanning direction, to a column address, a row address and a bank address of an SDRAM; the address mapping unit assigning lower N bit(s) for indicating an address corresponding to a burst size of a burst transfer among the main scanning address, to lower bit(s) of the column address, and assigning predetermined number of bit(s) arranged successively to an upper bit side of the lower N bit(s) among the main scanning address, to the bank address; and an access executing unit configured to read or write one line of image data in the main scanning direction by carrying out the burst transfer successively multiple times in a multibank operation while the sub-scanning address is changed at an end of the burst transfer, wherein the N is a positive integer.

Preferably, the memory control device corrects a skew in the two-dimensional image, a bow in the two-dimensional image or both of the skew and the bow by shifting the pixels in the sub-scanning direction, and the burst size is set in accordance with minimum number of the pixels arranged successively in the main scanning direction, which are shifted by a same shift amount when the skew or the bow is corrected.

Preferably, the N is changeable by arbitrarily setting the N.

Preferably, the burst size in reading of the image data from the SDRAM is same as the burst size in writing of the image data in the SDRAM.

Preferably, the burst size in reading of the image data from the SDRAM is different from the burst size in writing of the image data in the SDRAM.

Preferably, the address mapping unit assigns lower n bit(s) for indicating the address corresponding to the burst size in the writing of the image data among the main scanning address, to bit(s) which are a part of the bank address, the n being a positive integer, the address mapping unit assigns bit(s) arranged successively to an upper bit side of lower m bit(s) for indicating the address corresponding to the burst size in the reading of the image data among the main scanning address, to bit(s) which are another part of the bank address, the m being a positive integer which is different from the n.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 9 is a view showing the first type of address mapping;

FIG. 10 is a view showing the positions of the image data on the memory and the contents of the burst transfer for writing the data in the memory, in case that one line of the image data in the main scanning direction is written while the line position is moved in the sub-scanning direction according to the address mapping shown in FIG. 9, in order to correct the skew/bow;

FIG. 12 is a view showing the second type of address mapping;

FIG. 13 is a view showing the positions of the image data on the memory and the contents of the burst transfer for writing the data in the memory, in case that one line of the image data in the main scanning direction is written while the line position is moved in the sub-scanning direction according to the address mapping shown in FIG. 12, in order to correct the skew/bow;

FIG. 14 is a view showing the third type of address mapping;

FIG. 16 is a view showing the operation timing of the DDR-SDRAM in the burst transfer in case that the burst length is set to "8";

FIGS. 21A and 21B are a view showing the activating timing of the memory in case of FIG. 20.

DETAILED DESCRIPTION OF PREFERRED EMBODIMENT

Hereinafter, a preferred embodiment of the present invention will be explained with reference to the accompanying drawings.

Figure 1:
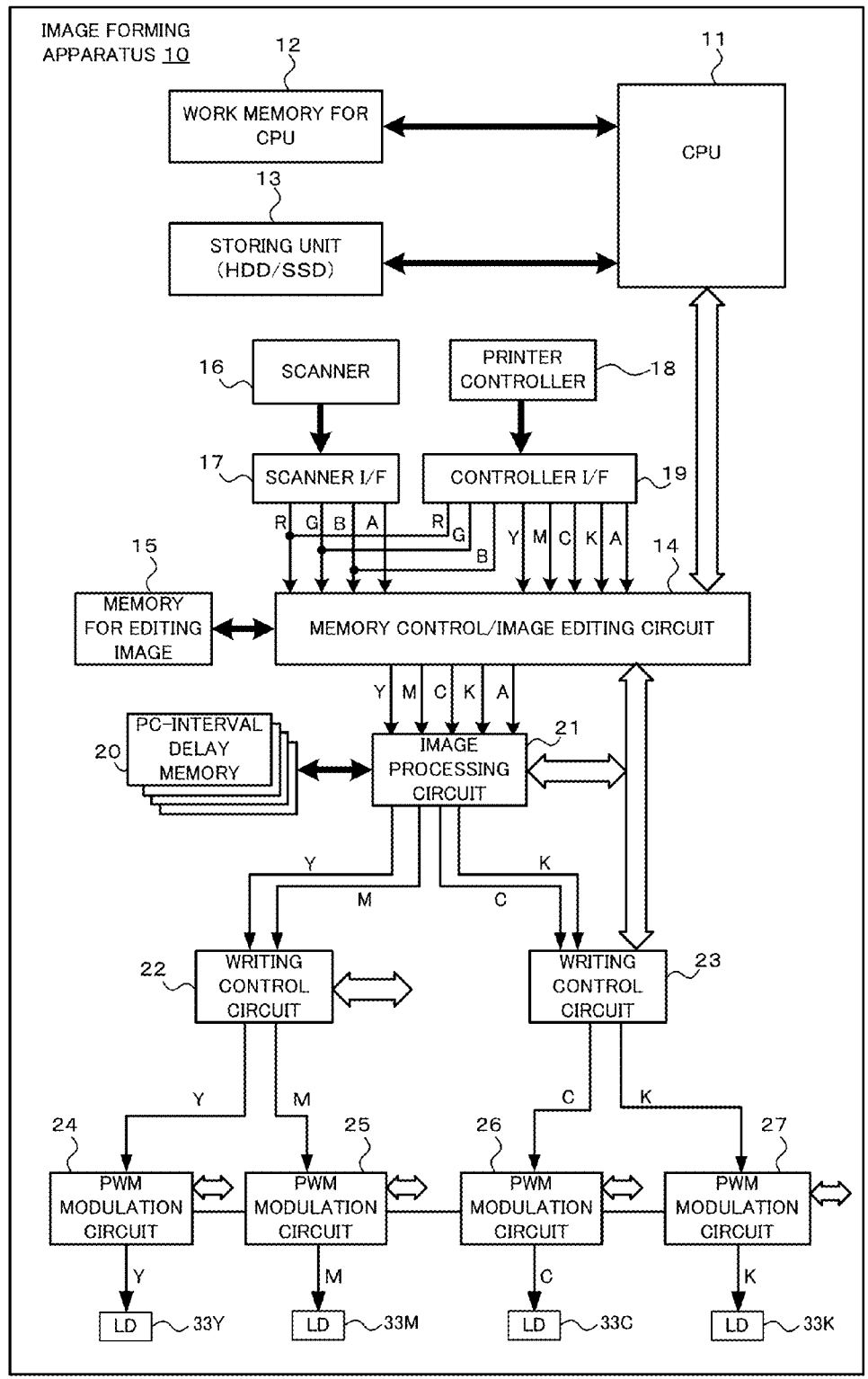
FIG. 1 is a view showing the schematic diagram of the image forming apparatus according to the embodiment.

FIG. 1 shows the schematic diagram of the image forming apparatus 10 according to the embodiment. The image forming apparatus 10 is a so-called multi-function peripheral for printing out an image by forming the image on the recording sheet in accordance with the image data obtained by optically reading the original with a scanner 16 and/or in accordance with the image data obtained by rasterizing the print data with a printer controller 18.

The image forming apparatus 10 comprises a CPU 11 as a control unit for controlling the whole operation of the image forming apparatus 10. The CPU 11 carries out the processing in accordance with the program stored in a ROM (Read Only Memory) which is not shown in the drawing and the program stored in the storing unit 13 which will be described later.

The CPU 11 is connected with a work memory 12 for the CPU 11, and the storing unit 13 comprising an HDD (Hard Disk Drive), an SSD (Solid State Drive) and the like. Further, the CPU 11 is connected with a memory control/image editing circuit 14, an image processing circuit 21, writing control circuits 22 and 23 and PWM modulation circuits 24 to 27 via a CPU bus.

The memory control/image editing circuit 14 is connected with a scanner I/F 17 for fetching the image data from the scanner 16, a controller I/F 19 for fetching the image data from the printer controller 18, and fetches the image data. Further, the memory control/image editing circuit 14 is connected with a memory 15 for editing an image as an editing area when the image data fetched from the scanner 16 and the printer controller 18 is edited. The edited image data is output to the image processing circuit 21.

The image data fetched from the scanner I/F 17 is a color image data having the data including color components R (red), G (green) and B (blue) and the attribute information A. The image data fetched from the controller I/F 19 is a color image data having the data including color components Y (yellow), M (magenta), C (cyan) and K (black) and the attribute information A. Both of the image data are bitmap type of image data in which pixels are arranged in the main scanning direction and in the sub-scanning direction which is perpendicular to the main scanning direction so as to form a matrix.

The memory control/image editing circuit 14 has the function for carrying out the data transfer between the memory 15 for editing the image and the work memory 12 for the CPU 11. In detail, the memory control/image editing circuit 14 temporarily stores the image data fetched from the scanner 16, the printer controller 18 and the like, in the memory 15 by compressing the image data. Then, the memory control/image editing circuit 14 stores the image data in the HDD of the storing unit 13 via the work memory 12. Further, the memory control/image editing circuit 14 has the function for reading out the data stored in the HDD and returning the image data to the memory 15 via the work memory 12.

Further, the memory control/image editing circuit 14 has the function for editing the image data stored in the memory 15 and outputting the image data to the image processing circuit 21. In detail, the memory control/image editing circuit 14 carries out the compression, the enlargement and the reduction of the image data, the preparation of the thumbnail image, the image storing format conversion (plane/point transformation) the RGB/YMCK conversion and the like, when the image data is stored in the memory 15. The image data is output from the memory 15 to the image processing circuit 21 in the format of YMCK+A.

The image processing circuit 21 is connected with the PC-interval delay memories 20 and the writing control circuits 22 and 23. The image processing circuit 21 writes the image data input from the memory control/image editing circuit 14, in the PC-interval delay memories 20 (corresponding to the drum-interval delay memory) according to the color components, and reads out the image data at the output timing corresponding to each color component to output the image data to the writing control circuits 22 and 23. The term "PC" indicates the photoconductive drum unit.

The image data having the respective color components of Y, M, C and K are input from the image processing unit 21 to the PWM modulation circuits 24 to 27 according to the color components via the writing control units 22 and 23. The PWM modulation circuits 24 to 27 operates the laser diodes (LD) 33Y, 33M, 33C and 33K of the photoconductive drum units corresponding to the respective color components, in accordance with the input image data.

The image processing circuit 21 carries the skew/bow correction while the image data are written in the PC-interval delay memories 20 and are read from the PC-interval delay memories 20. The PC-interval delay memory 20 is a DDR-SDRAM.

Figure 2:
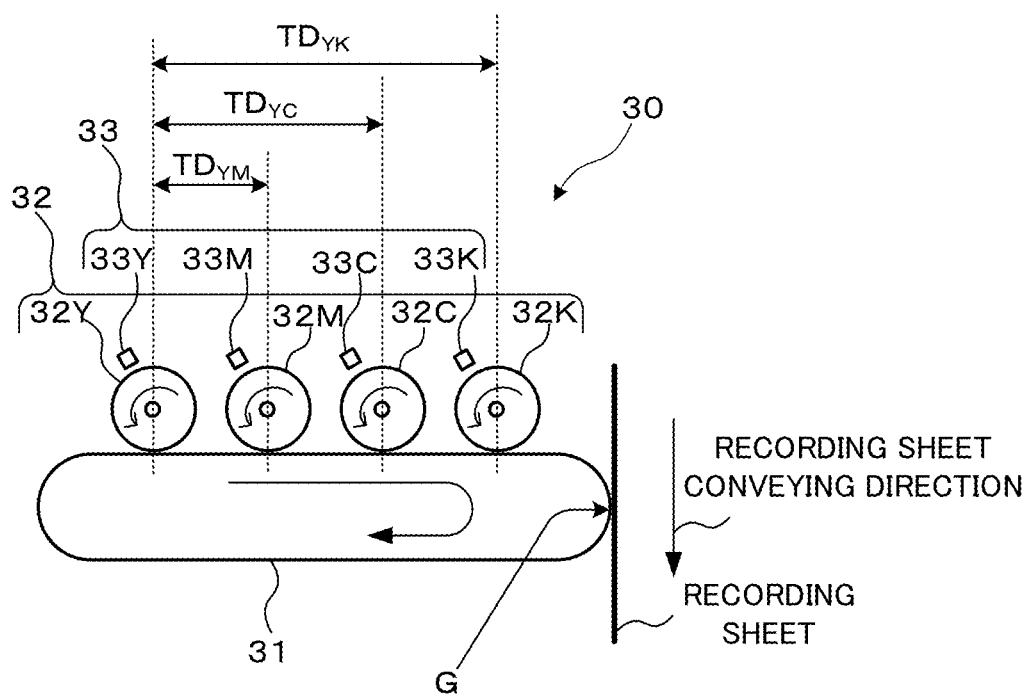
FIG. 2 is a view showing the main structure of the engine unit (image forming unit) of the image forming apparatus.

FIG. 2 shows the main structure of the engine unit (image forming unit) 30 of the image forming apparatus 10. The image forming apparatus 10 is the tandem type of image output apparatus, and comprises an endless intermediate transfer belt 31 which is bridged annularly and which has a predetermined width, four toner image forming units which forms single color toner images having the colors of Y, M, C and K, respectively on the intermediate transfer belt 31, a sheet feeding unit for feeds the recording sheets, a conveying unit for conveying the fed sheets, a fixing device and the like.

In FIG. 2, only the intermediate transfer belt 31, the photoconductive drums 32Y, 32M, 32C and 32K and the laser diodes 33Y, 33M, 33C and 33K are shown. The engine unit 30 is the tandem type of image forming unit for forming a two-dimensional image by repeating the image forming operation in the main scanning direction line by line while the image forming position is moved in the sub-scanning direction.

Each toner image forming unit comprises the photoconductive drum 32Y, 32M, 32C, 32K as a cylindrical electrostatic latent image carrier on which the electrostatic latent image is formed. Further, in each toner image forming unit, a charging device, a developing device, a cleaning device, the corresponding laser diode 33Y, 33M, 33C or 33K and the like are provided around each of the photoconductive drums 32Y, 32M, 32C and 32K.

The photoconductive drums 32Y, 32M, 32C and 32K are arranged at the predetermined intervals along the intermediate transfer belt 31 so as to direct each shaft of the photoconductive drums 32Y, 32M, 32C and 32K in the direction perpendicular to the direction in which the intermediate transfer belt 31 rotates. Each of the photoconductive drums 32Y, 32M, 32C and 32K rotates in the constant direction so as to contact with the intermediate transfer belt 31. Each charging device uniformly charges the corresponding photoconductive drum 32Y, 32M, 32C or 32K. The electrostatic latent image is formed on each of the photoconductive drums 32Y, 32M, 32C and 32K by carrying out the exposure scanning for the surface of each of the photoconductive drums 32Y, 32M, 32C and 32K, which is uniformly charged with the charging device, by using each of the laser diodes 33Y, 33M, 33C and 33K for switching on/off the light emitting diodes corresponding to the respective pixels in accordance with the image data.

Each developing device visualizes the electrostatic latent image formed on each of the photoconductive drums 32Y, 32M, 32C and 32K, by using the toner having the corresponding color. Each toner image is transferred to the intermediate transfer belt 31 at the position on which each of the photoconductive drums 32Y, 32M, 32C and 32K contacts with the intermediate transfer belt 31. When the respective toner image forming units carry out the above operation, the respective single color toner images are overlapped on the rotating intermediate transfer belt and the full color toner image is obtained.

In order to overlap the dots having the colors of Y, M, C and K, respectively, to be printed on the same position of the recording sheet, at the same position of the intermediate transfer belt 31, it is necessary to delay the timing at which the image data is output to the laser diode 33, as the photoconductive drum 32 is positioned on the downstream side. The above timing is required to be delayed in accordance with the time difference (each time delay $TD_{YM}$, $TD_{YC}$, $TD_{YK}$ shown in FIG. 2) in the timing of passing the above same position of the intermediate transfer belt 31 through the respective photoconductive drums 32Y, 32M, 32C and 32K. In order to eliminate the time difference, the PC-interval delay memories 20 shown in FIG. 1 are used. Each of the PC-interval delay memories 20 has a two-dimensional image storing area for storing the image data by arranging the pixels in the main scanning direction and in the sub-scanning direction which is perpendicular to the main scanning direction. In the image storing area, the bitmap type of image data is stored.

Figure 3:
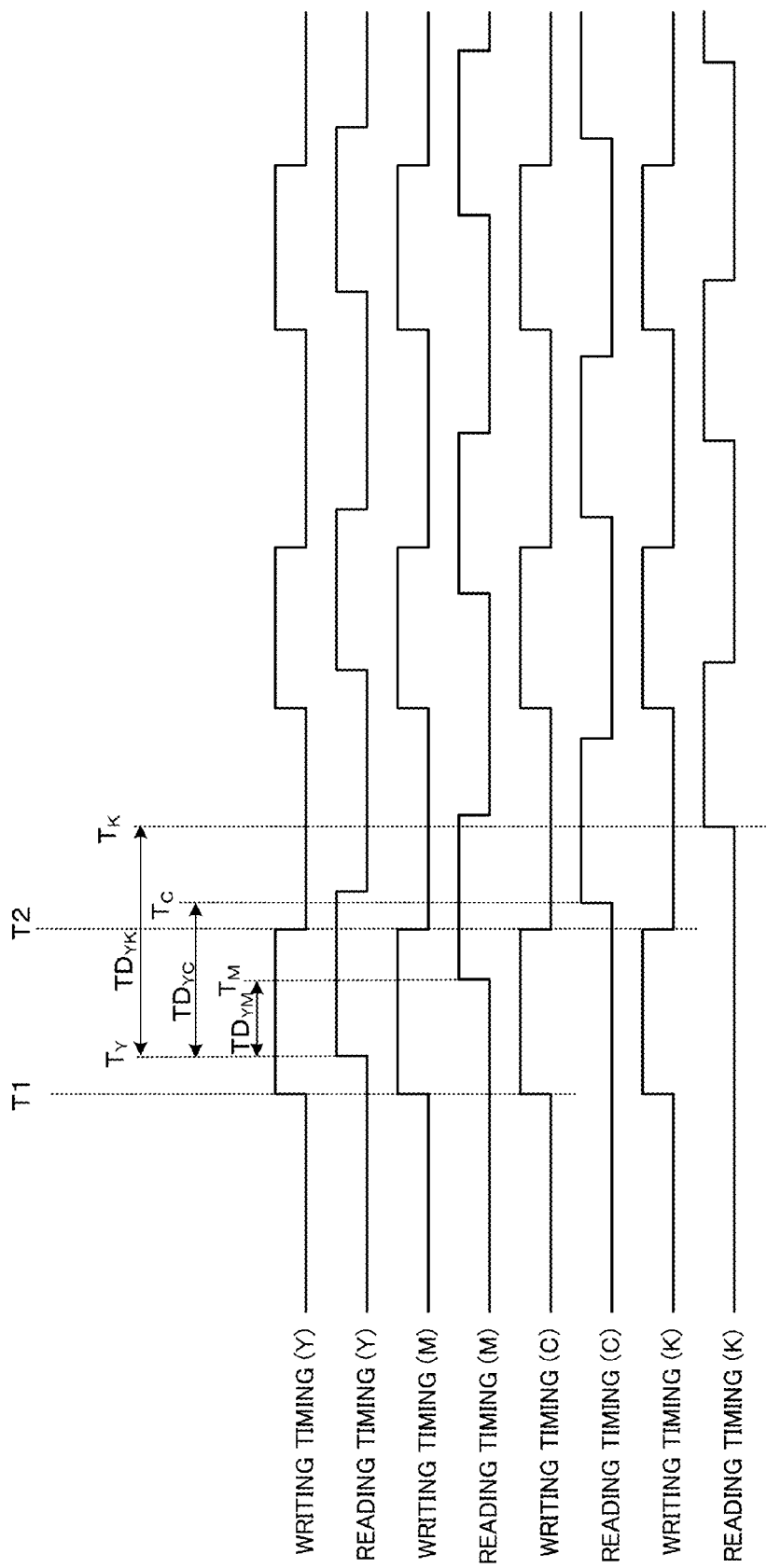
FIG. 3 is a view showing an example of the timing of writing each image data in the PC-interval delay memory and the timing of reading each image data from the PC-interval delay memory.

FIG. 3 shows an example of the timing of writing each image data in the PC-interval delay memory 20 and the timing of reading each image data from the PC-interval delay memory 20. The process for writing each single color image data for one page in the PC-interval delay memory 20 is carried out coinstantaneously for all of the colors from the time T1 to the time T2. The process for reading each single color image data from the PC-interval delay memory 20 is carried out so as to delay the reading of M color image data by the time delay $TD_1$ from the timing $T_Y$ at which Y color image data is read, to delay the reading of C color image data by the time delay $TD_{YC}$ from the timing $T_Y$ and to delay the reading of K color image data by time delay $TD_{YK}$ from the timing $T_Y$, respectively. As a result, the image is formed so as to overlap the toners for one pixel, which have the respective colors, at the same position of the intermediate transfer belt 31.

In the image forming apparatus 10, as shown in FIG. 2, the full color toner image formed on the intermediate transfer belt 31 is transferred to the recording sheet from the intermediate transfer belt 31 at the secondary transfer position G. Then, the toner image transferred to the recording sheet is fixed when the recording sheet passes through the fixing device, and the recording sheet is discharged to the discharge tray.

Figure 4:
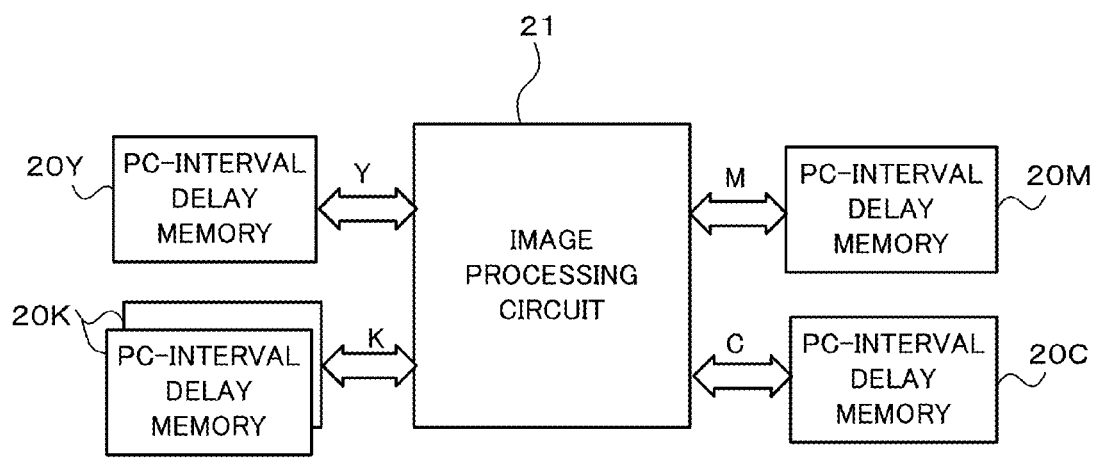
FIG. 4 is a view showing the image processing circuit and the PC-interval memories which are connected with the image processing circuit.

FIG. 4 shows the image processing circuit 21 and the PC-interval memories 20 which are connected with the image processing circuit 21. Each of the PC-interval delay memory 20Y for storing the Y color image data, the PC-interval delay memory 20M for storing the M color image data and the PC-interval delay memory 20C for storing the C color image data is a band buffer formed by the DDR-SDRAM having the capacity of 1 Gbit. The PC-interval memory 20K for storing the K color image data is a band buffer formed by the DDR-SDRAM having the capacity (2 Gbits) which is twice as large as those of the other PC-interval memories 20. In case of the K color, because the time delay $TD_{YK}$ is larger than the time delays corresponding to the other color components, the PC-interval memory 20K has a large capacity in consideration of the time delay $TD_{YK}$.

Figure 5:
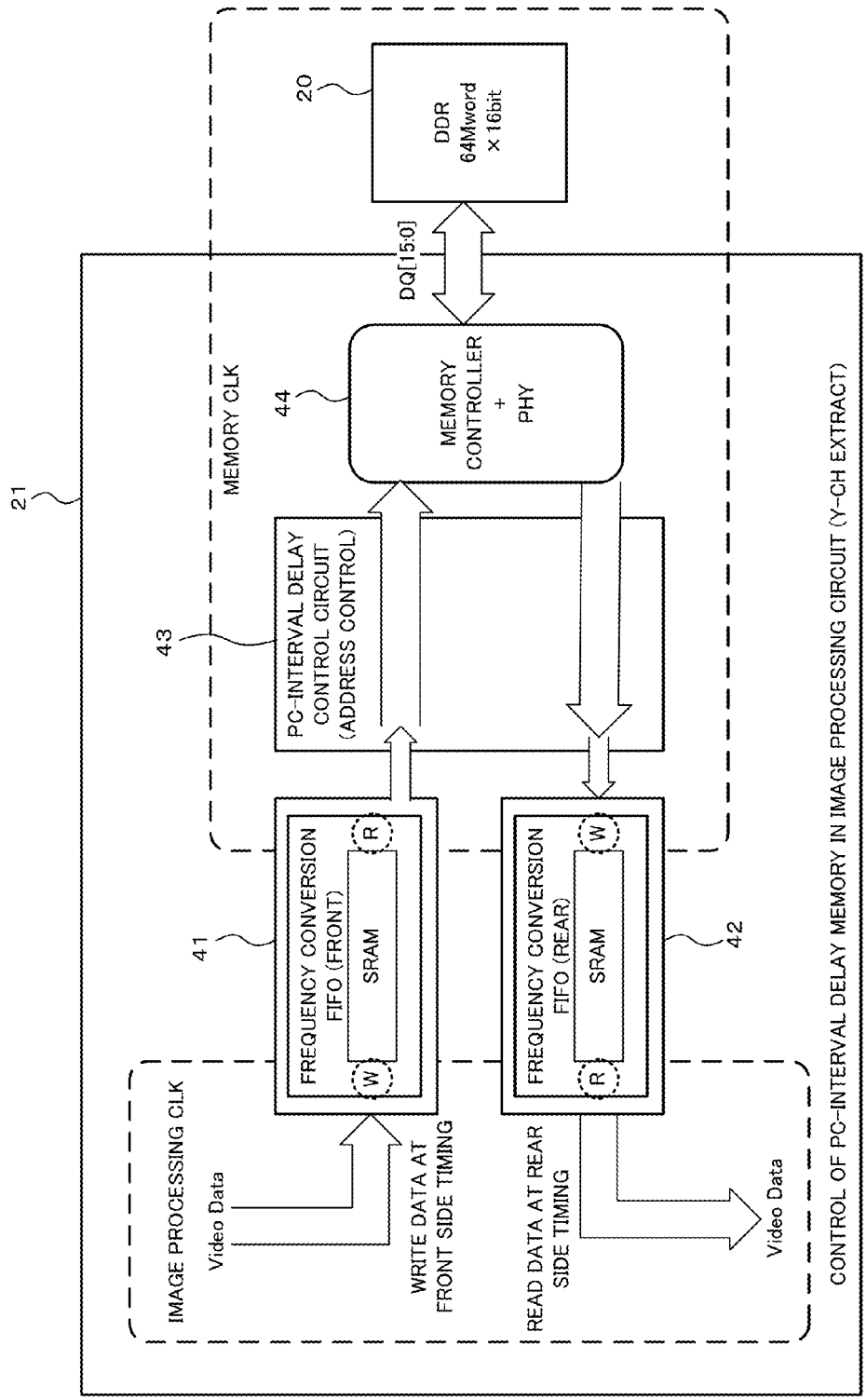
FIG. 5 is a view showing the extracted circuit configuration for carrying out the writing and reading control for the PC-interval delay memory for storing the Y color image data in the image processing circuit.

FIG. 5 shows the extracted circuit configuration for carrying out the writing and reading control for the PC-interval delay memory 20Y for storing the Y color image data in the image processing circuit 21. In the image processing circuit 21, the circuit shown in FIG. 5 is provided for each color component. The above circuits corresponding to the respective colors carry out the same operation except the timing of reading the image data. Therefore, for the purpose of the explanation thereof, in this embodiment, the circuit for reading and writing the Y color image data will be explained. In the following explanation of the above circuit, the character "Y" indicating the Y color is omitted from the numeral references. Further, the side on which the image data is written in the PC-interval memory 20 is referred to as "front side". The side on which the image data is read from the PC-interval memory 20 is referred to as "rear side".

The extracted circuit shown in FIG. 5 comprises a frequency conversion FIFO (front) 41 and a frequency conversion FIFO (rear) 42 which are FIFO memories for carrying out the frequency conversion between the image processing clock and the memory clock. The image data is written in the frequency conversion FIFO (front) 41 sequentially from the memory control/image editing circuit 14 in synchronization with the image processing clock.

The PC-interval delay control circuit 43 reads out the image data sequentially from the frequency conversion FIFO (front) 41 in synchronization with the memory clock. Further, the PC-interval delay control circuit 43 generates the addresses for writing the read image data in the PC-interval delay memory 20, and outputs the addresses to the memory controller 44. The memory controller 44 outputs the control command, the address signal and the like to the PC-interval delay memory 20 in order to write the image data in the PC-interval delay memory 20 and to read the image data from the PC-interval delay memory 20.

The PC-interval delay control circuit 43 has the function for generating the addresses for reading out the image data from the PC-interval delay memory 20, and outputting the addresses to the memory controller 44. Further, the PC-interval delay control circuit 43 has the function for writing the image data read from the PC-interval delay memory 20Y in the frequency conversion FIFO (rear) 42.

The image data written in the frequency conversion FIFO (rear) 42 is output to the writing control unit 22 by reading out the image data sequentially at the rear side timing.

Figure 6:
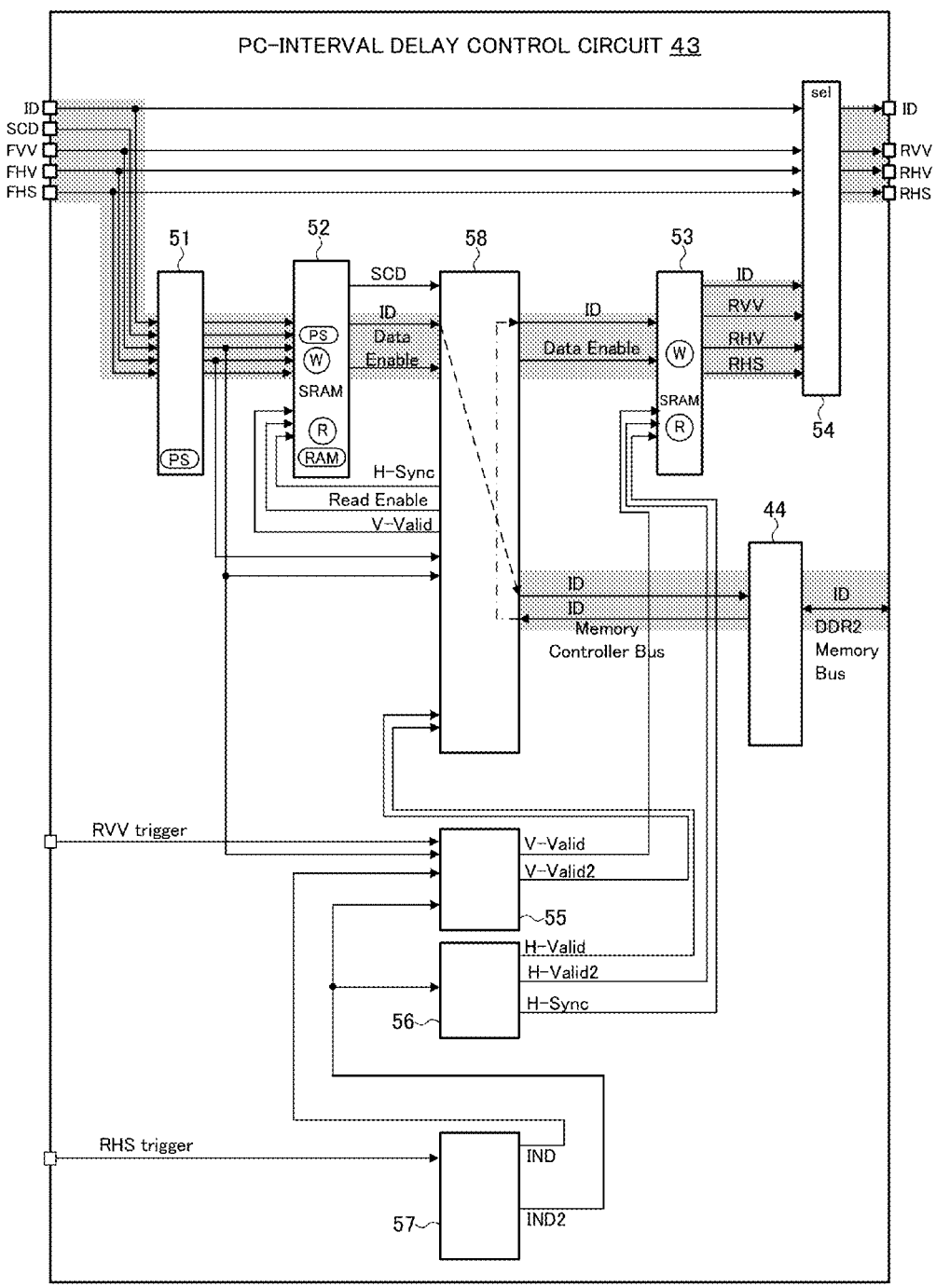
FIG. 6 is a view showing the detail of the structure of the PC-interval delay control circuit.

FIG. 6 shows the detail of the structure of the PC-interval delay control circuit 43. The PC-interval delay control circuit 43 comprises a timing adjustment circuit 51, a front side FIFO control circuit 52, a rear side FIFO control circuit 53, an output selector 54, a rear V-Valid control circuit 55, a rear H-Valid control circuit 56, a rear H-Sync control circuit 57 and an address control circuit 58. In FIG. 6, the memory controller 44 shown in FIG. 5 is integrated into the PC-interval delay control unit 43. As shown in FIG. 5, the memory controller 44 may be provided out of the PC-interval delay control unit 43.

The image data (ID), the skew correction data (SCD) and each signal of the front V-Valid (FVV), the front H-Valid (FHV), the front H-Sync (FHS), the rear V-Valid trigger (RVV trigger) and the rear H-Sync trigger (RHS trigger) are input to the PC-interval delay control unit 43.

The front V-Valid is used to store the input image data in the PC-interval delay memory 20, and is a signal indicating the valid period of the input image data in the sub-scanning direction. The front H-Valid is used to store the input image data in the PC-interval delay memory 20, and is a signal indicating the valid period of the input image data in the main scanning direction. The front H-Sync is used to store the input image data in the PC-interval delay memory 20, and is a synchronization signal for recognizing the top position of each line of the input image data in the main scanning direction. The skew correction data is data indicating the skew/bow correction amount. For example, the skew correction data indicates the shift amount in the sub-scanning direction.

The rear V-Valid trigger is a synchronization signal for generating the rear V-Valid (RVV). The rear H-Sync trigger is a synchronization signal for generating the rear H-Sync (RHS).

The image data and each signal of the rear V-Valid, the rear H-Valid (RHV) and the rear H-Sync are output from the PC-interval delay control unit 43. The rear V-Valid is used to output the image data from the PC-interval delay control unit 43 to the writing control circuit 22, and is a signal indicating the valid period of the output image data in the sub-scanning direction. The rear H-Valid is used to output the image data from the PC-interval delay control unit 43 to the writing control circuit 22, and is a signal indicating the valid period of the output image data in the main scanning direction. The rear H-Sync is used to output the image data from the PC-interval delay control unit 43 to the writing control circuit 22, and is a synchronization signal for recognizing the top position of each line of the output image data in the main scanning direction.

In accordance with the above signals, the PC-interval delay control unit 43 carries out the processing for writing the image data input from the front side in the PC-interval delay memory 20 via the frequency conversion FIFO (front) 41, and the processing for reading out the image data from the PC-interval delay memory 20 with the predetermined time difference and for outputting the image data to the writing control circuit 22 via the frequency conversion FIFO (rear) 42.

Figure 7:
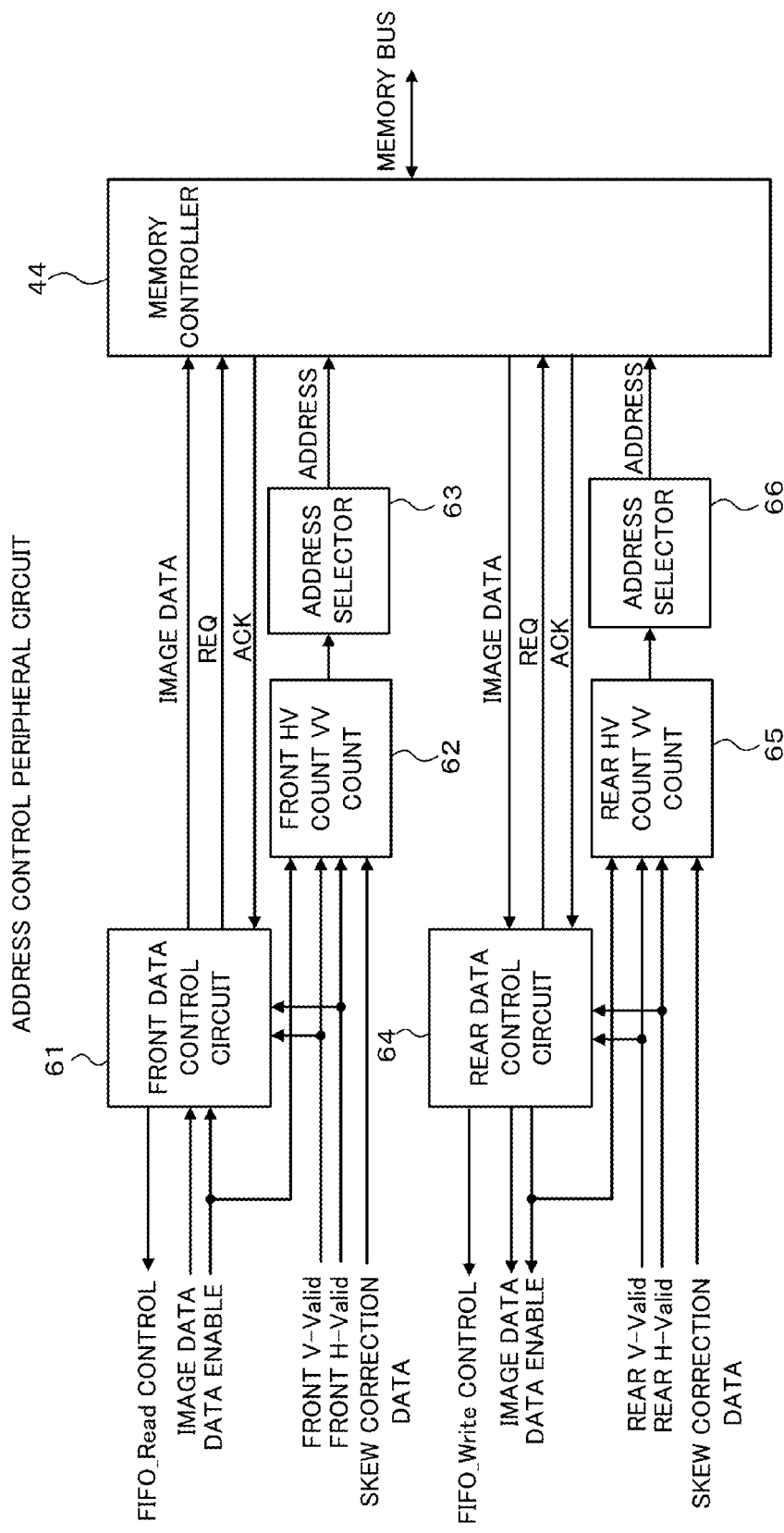
FIG. 7 is a view showing the internal structure of the address control circuit and the peripheral circuit thereof.

FIG. 7 shows the internal structure of the address control circuit and the peripheral circuit thereof. The front HV count VV count 62 generates the main scanning address and the sub-scanning address indicating the pixel position of the image data in one page, which is input to the front data control circuit 61, in accordance with the data enable, the front V-Valid and the front H-Valid. At this time, in accordance with the skew correction data (for writing) input from the outside, the sub-scanning address is increased or decreased, and the sub-scanning address indicating the position of the shifted pixel is output.

The address selector 63 has the function for converting the address input from the front HV count VV count 62 (changing the position of each bit). That is, the address selector 63 has the function for carrying out the address mapping which will be described later.

The rear HV count VV count 65 generates the main scanning address and the sub-scanning address indicating the pixel position of the image data in one page, which is output from the rear data control circuit 64, in accordance with the data enable, the rear V-Valid and the rear H-Valid. At this time, in accordance with the skew correction data (for reading) input from the outside, the sub-scanning address is increased or decreased, and the sub-scanning address indicating the position of the shifted pixel is output. Only in case of the third type which will be explained, the skew/bow correction on the rear side may be carried out. The address selector 66 has the function for converting the address input from the rear HV count VV count 65 (changing the position of each bit). That is, the address selector 66 has the function for carrying out the address mapping which will be described later.

The skew correction data is previously prepared and is stored in the storing unit 13. The CPU 11 reads out the skew correction data and sets the skew correction data to the image processing circuit 21 or notifies the image processing circuit 21 of the skew correction data. The address control circuit 58 instructs the memory controller 44 to carry out or not to carry out the burst transfer successively in the multibank operation which will be explained. The address control circuit 58 and the memory controller 44 have the function as the access executing unit for executing the writing or the reading of one line of image data in the main scanning direction by carrying out the burst transfer multiple times successively in the multibank operation.

Figure 8:
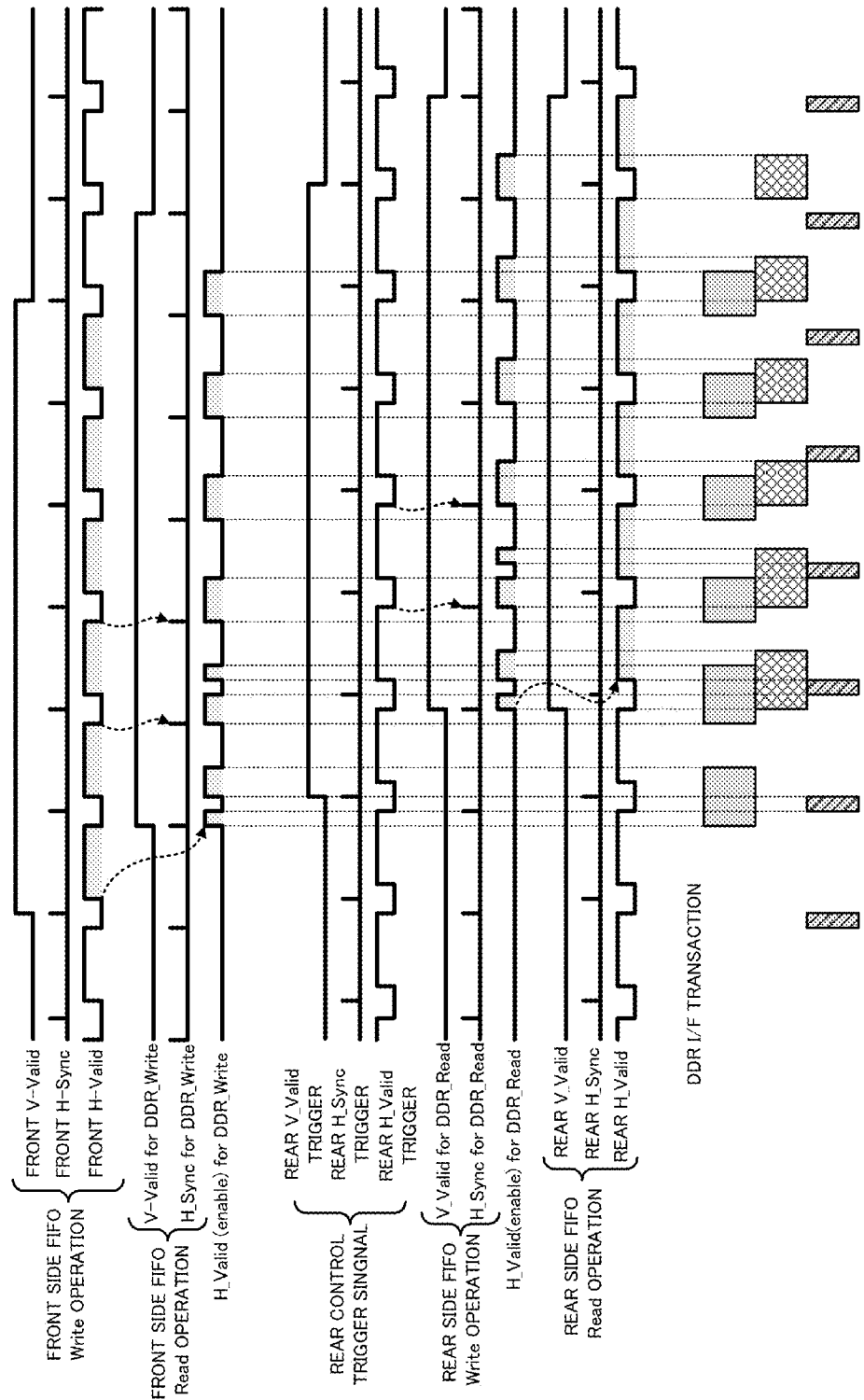
FIG. 8 is a view showing the timing chart of each signal relating to the PC-interval delay control circuit.

FIG. 8 shows the timing chart of each signal relating to the PC-interval delay control circuit 43. In the operation for writing the image data in the frequency conversion FIFO (front) 41, the image data is written in the frequency conversion FIFO (front) 41 in case that the front H-Valid is in the valid period during the valid period of the front V-Valid. In the operation for reading the image data from the frequency conversion FIFO (front) 41, the image data is read from the frequency conversion FIFO (front) 41 and is written in the PC-interval delay memory 20 by avoiding the refresh period of the PC-interval delay memory 20 (which is referred to as "REF" in FIG. 9).

The rear V-Valid is delayed from the front V-Valid by the time which is necessary for the drum-interval delay. The image data is read from the PC-interval delay memory 20 at the timing matched with the rear V-Valid and the rear H-Valid by avoiding the refresh period, and is written in the frequency conversion FIFO (rear) 42. The image data is read successively from the frequency conversion FIFO (rear) 42 in synchronization with the image processing clock when the rear V-Valid and the rear H-Valid are in the valid period.

In the image forming apparatus 10, for example, in case that each shaft direction of the photoconductive drums 32Y, 32M, 32C and 32K is not parallel to each main scanning direction of the laser diodes 33Y, 33M, 33C and 33K (arrangement direction of the light-emitting diodes), the skew in which the image is skewed is caused. That is, when the positional relation in which the sub-scanning direction of each image formed by the photoconductive drums 32Y, 32M, 32C and 32K is perpendicular to the main scanning direction of each of the laser diodes 33Y, 33M, 33C and 33K is shifted, the skew is caused by the above shift.

The PC-interval delay control circuit 43 carries out the processing for writing the image data in the PC-interval delay memory 20 and the processing for reading the image data from the PC-interval delay memory 20 in order to absorb the drum-interval delay. Further, at the same time, the PC-interval delay control circuit 43 carries out the skew/bow correction. For example, in the writing processing, the PC-interval delay control circuit 43 writes the image data of each pixel of the original image, on the position which is shifted in the sub-scanning direction by the skew correction amount corresponding to the position of the pixel in the main scanning direction on the original image, with respect to the position of the pixel in the sub-scanning direction on the original image. That is, the PC-interval delay control circuit 43 as the memory control device has the function for correcting the skew in the two-dimensional image, the bow in the two-dimensional image or both of the skew and the bow by shifting the pixels in the sub-scanning direction. In the reading processing, one line of the image data in the main-scanning direction is read by fixing the position in the sub-scanning direction. Thereby, the image which is deformed in the sub-scanning direction is read from the PC-interval delay memory 20. When the above image is printed by the image forming unit, the skew/bow is cancelled. That is, the image data to be output is output to the engine unit 30 via the PC-interval delay memory 20, and the image data is corrected so as to cancel the skew/bow in the image output by the engine unit 30, by shifting the pixel position in the sub-scanning direction by the PC-interval delay control circuit 43 while the image data passes through the PC-interval delay memory 20.

Next, the address mapping which is carried by the address selectors 63 and 66 of the PC-interval delay control circuit 43 of the image forming apparatus 10, will be explained.

In this embodiment, the address is mapped so as to be able to change the sub-scanning address by using the multibank operation.

In the SDRAM, a plurality of banks can be operated independently. In case that the multibank operation in which the burst transfer (read or write) to the bank 2 is started by activating the bank 2 in accordance with the active command during the burst transfer (read or write) to the bank 1, is carried out, the overhead caused by changing the bank is suppressed. In particular, when the active command is output at the timing at which the burst transfer to the bank 2 is started immediately after finishing the burst transfer to the bank 1, the overhead caused by changing the bank is minimized.

Further, in case that the bank is changed by activating one bank during the bank transfer to another bank as described above, the row address can be changed in the read/write operation before changing the bank and the read/write operation after changing the bank. In other words, when the row address is changed in the multibank operation as described above, the row address can be changed without causing the overhead which is the precharge.

In the image forming apparatus 10 according to the embodiment, the address is mapped so as to necessarily change the bank at the timing at which it is required to change the sub-scanning address in order to correct the skew/bow. As the address mapping, there are three types of the address mapping which are the first type, the second type and the third type. Hereinafter, each of the above types will be explained.
<First Type>

FIG. 9 shows the first type of address mapping. In the upper portion of FIG. 9, the sub-scanning address and the main scanning address which are generated by the front HV count VV count 62 or the rear HV count VV count 65 shown in FIG. 7, are shown. The lower portion of FIG. 9 shows the bits to which the addresses shown in the upper portion of FIG. 9 are assigned in the signal to be output to the memory. In FIG. 9, the lower 3 bits of the sub-scanning address are assigned to the bank address.

In detail, the lower bits [0-9] of the main scanning address are assigned to the bits [0-9] of the column address of the memory. The upper bits [10-12] of the main scanning address are assigned to the bits [0-2] of the row address of the memory. Further, the lower 3 bits [0-2] of the sub-scanning direction are assigned to the bits [0-2] of the bank address. That is, the address selector 63 and the address selector 66 have the function as the address mapping unit for assigning the main scanning address indicating the pixel position in the main scanning direction of the two-dimensional image in which the pixels are arranged in the main scanning direction and in the sub-scanning direction, and the sub-scanning address indicating the pixel position in the sub-scanning direction, to the column address, the row address and the bank address of the PC-interval delay memory 20. Further, in the first type, each of the address selector 63 and the address selector 66 assigns the lower N bits (N is a positive integer and in case of this example, N is 10) for indicating the address corresponding to the burst size among the main scanning address, to the lower bits [0-9] of the column address. Each of the address selector 63 and the address selector 66 assigns the lower bits of the sub-scanning address to the bank address [0-2]. Further, the bits [3-12] of the sub-scanning address are assigned to the bits [3-12] of the row address. The bit [13] of the sub-scanning address is assigned to the chip select. The bit [14] of the sub-scanning address is substantially unnecessary and is not used because the number of the sub-scanning lines in one page is exceeded.

When the address assignment (mapping) is carried out as described above, in case that the line position in the sub-scanning direction is changed in the plus direction within the range of 7 lines from the base position, the bank address of the memory is changed. Then, as described above, even though the bank is changed in the multibank operation, that is, because one line of the image data in the main scanning direction is read or written by carrying out the burst transfer successively multiple times in the multibank operation while the address control circuit 58 and the memory controller 44 as the access executing unit change the value of the lower bits of the sub-scanning address at the end of the burst transfer, the overhead is reduced. Therefore, even though the line position in the sub-scanning direction is slightly shifted in order to correct the skew/bow, it is possible to suppress the increase in the overhead and carry out the skew/bow correction by carrying out the multibank operation.

FIG. 10 shows the positions of the image data on the memory and the contents of the burst transfer for writing the data in the memory, in case that one line of the image data in the main scanning direction is written while the line position is moved in the sub-scanning direction according to the address mapping shown in FIG. 9, in order to correct the skew/bow. Each box (block) shown in FIG. 10 is equivalent to the area having one pixel in the sub-scanning direction and the minimum burst length in the main scanning direction (in this example, 16 pixels). The above block indicates the minimum unit of the burst transfer.

In this example, the sub-scanning address is increased one-by-one from the block 1 to the block 5. The sub-scanning address is decreased one-by-one from the block 5 to the block 7. The sub-scanning address is not changed from the block 7. Because the bank address is changed in each burst transfer to the blocks 1 to 7, even though the sub-scanning address is changed, it is possible to suppress the overhead by the multibank operation.

In the first type, in case that the sub-scanning address is not changed, the burst transfer can be carried out by lengthening the burst length. In the example of FIG. 10, because the sub-scanning address is constant from the block 7, the burst transfer can be started by setting the length corresponding to a plurality of successive blocks to the burst length. That is, the burst size is set in accordance with the minimum number of the successive pixels in the main scanning direction, which are shifted by the same shift amount when the skew/bow is corrected.

On the other hand, in the first type, the circuit or the processing for judging whether the sub-scanning address is changed when the next block in the main scanning direction is written, is required. That is, in case that the sub-scanning address is changed, it is necessary to activate another bank in which the image data is written to the next block, during the burst transfer to the current block. Therefore, it is required to judge the necessity of the above activation of the bank and to change the processing in accordance with the necessity of the activation. The above processing is carried out by the address control circuit 58, and the address control circuit 58 instructs the memory controller 44 to carry out the necessary operation.

Further, because the upper 3 bits of the main scanning address are assigned to the row address of the memory, it is required to change the row address 8 times (7 times in case that the first setting of the row address is excluded) while one line of the image data in the main scanning direction is written. In case that the bank is changed by changing the sub-scanning address at the timing at which the row address is changed, the overhead is hardly caused. However, there is a high possibility that the bank is not changed at the above timing. Therefore, there are some cases in which the overhead is caused by changing the row address in the same bank, even though the row address is changed within 7 times.

The contents of the skew correction, which are shown in the upper portion of FIG. 10, are set as the skew correction data. For example, as the skew correction data, the correction data in which each shift amount of the blocks in the sub-scanning direction, which are arranged in the main scanning direction from the leading data to the trailing data is registered, is used. The front HV count VV count 62 shifts the sub-scanning address in accordance with the skew correction data. In case that the number of the successive blocks in the same sub-scanning position is registered, the burst length can be set in accordance with the registered number. Further, it is possible to judge whether another bank in which the image data is written to the next block is required to be activated during the burst transfer to the current block.

Figure 11A:
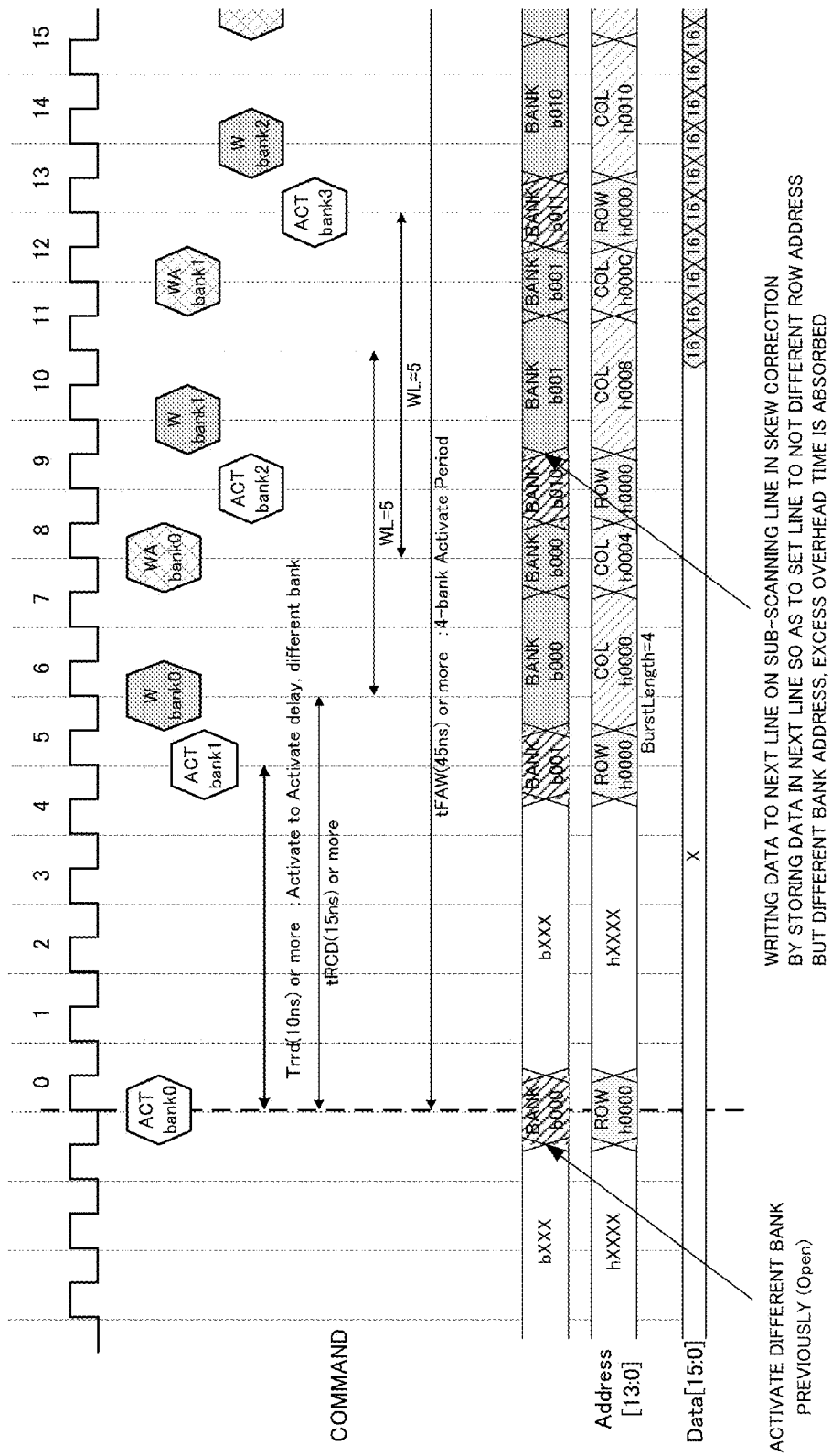
FIGS. 11A and 11B are a view showing the activating timing of the memory in case that the memory is accessed by the multibank operation.
Figure 11B:
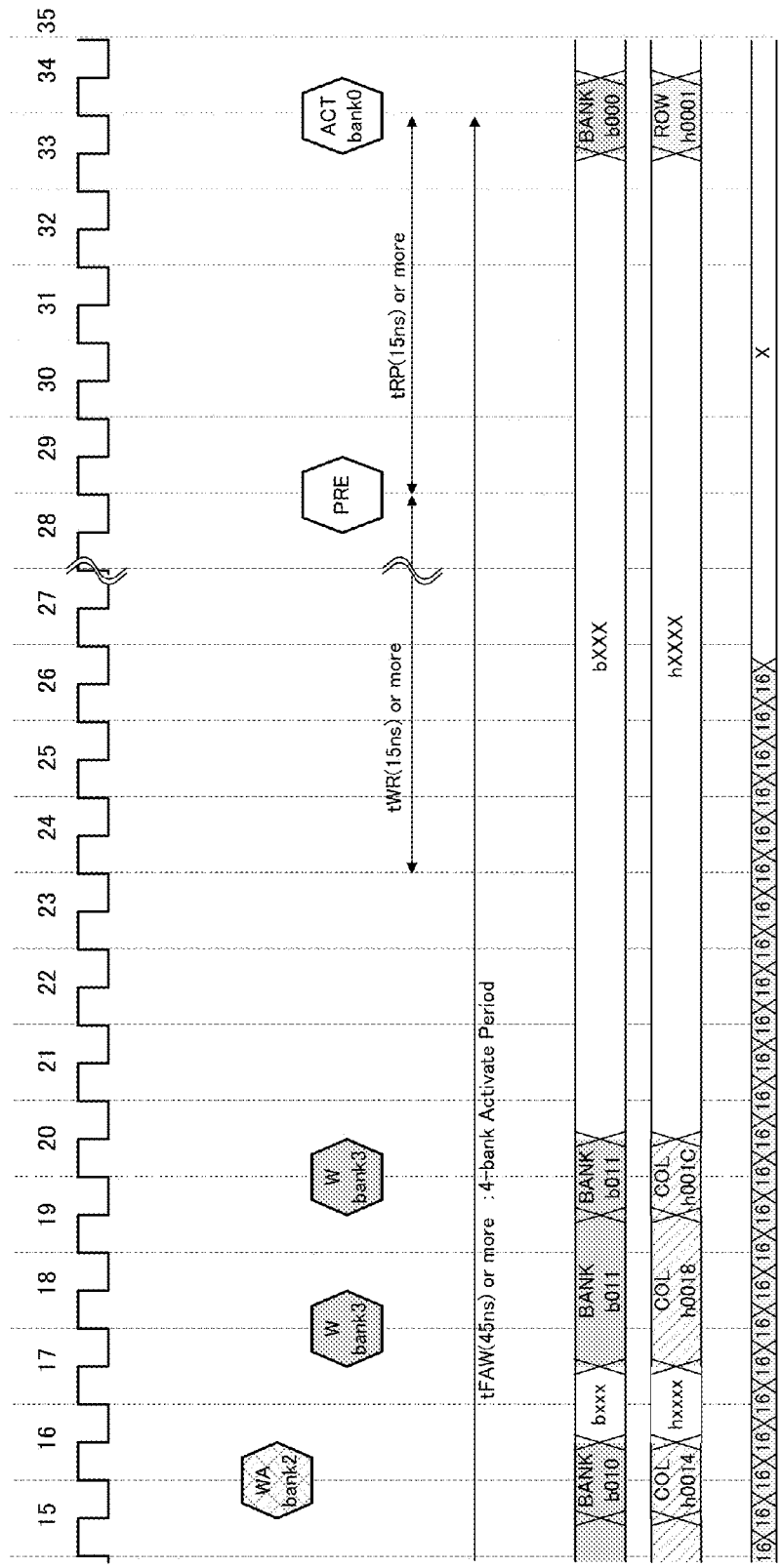
Figures 15A, 15B:
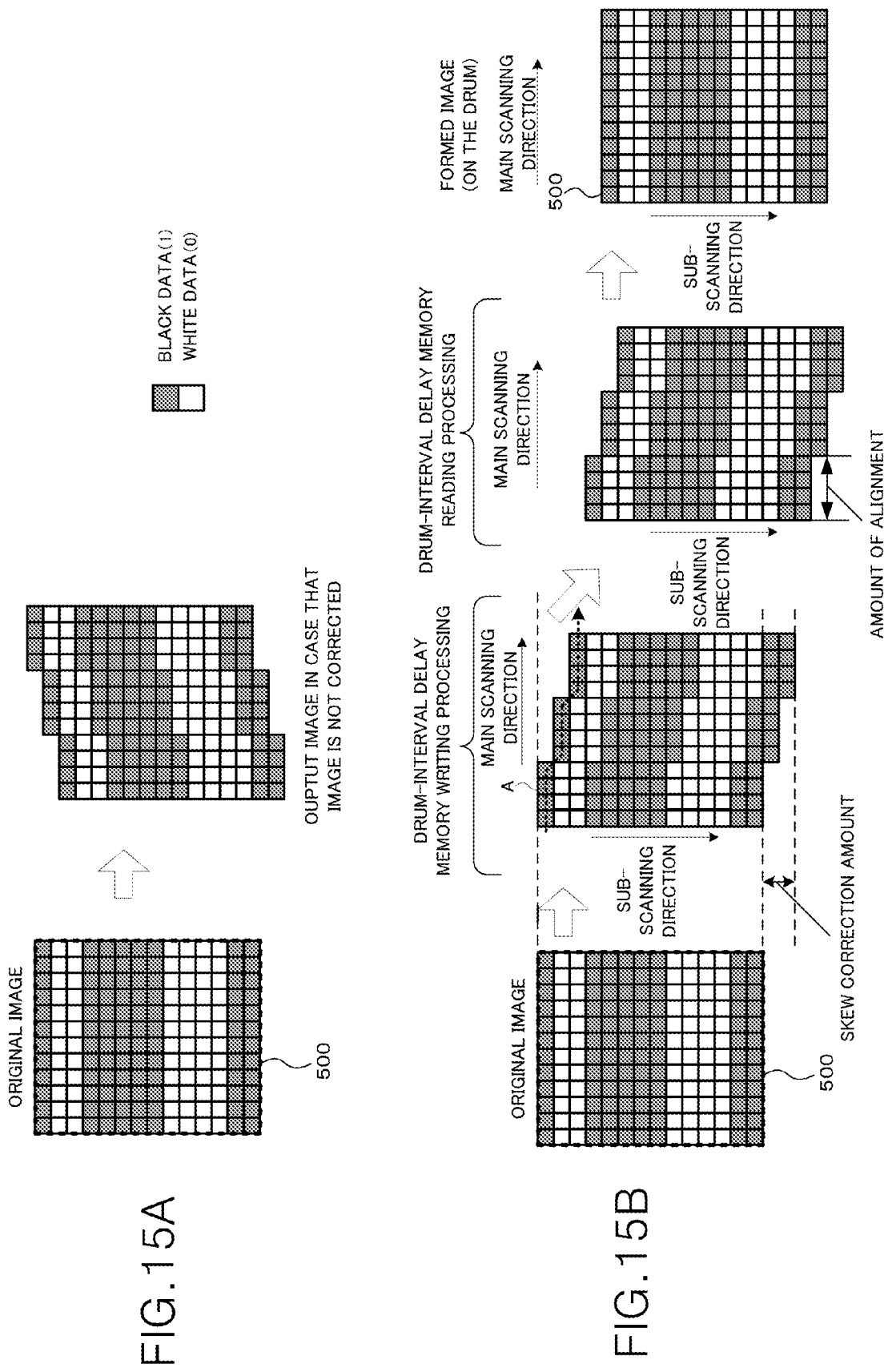
FIGS. 15A and 15B are views showing an example in which the skew and the bow are corrected by the image processing.
Figure 17:
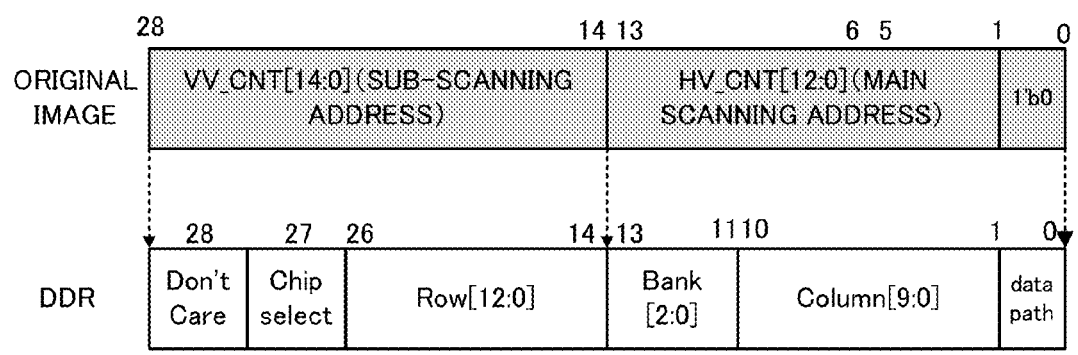
FIG. 17 is a view showing the address mapping in which the sub-scanning address of the image is assigned to the row address of the SDRAM, the lower bits of the main scanning address are assigned to the column address, and the higher bits of the main scanning address are assigned to the bank address.
Figure 18:
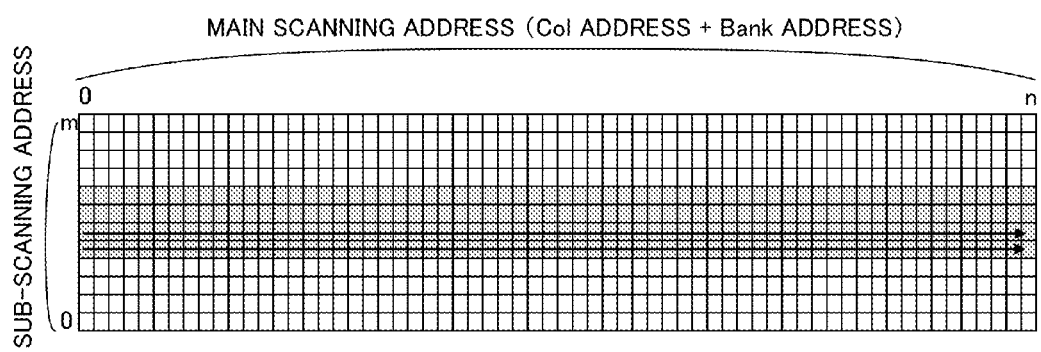
FIG. 18 is a view showing the situation in which one line of the image data in the main scanning direction is written without changing the sub-scanning address (pixel position in the sub-scanning direction) according to the address mapping shown in FIG. 17.
Figure 19A:
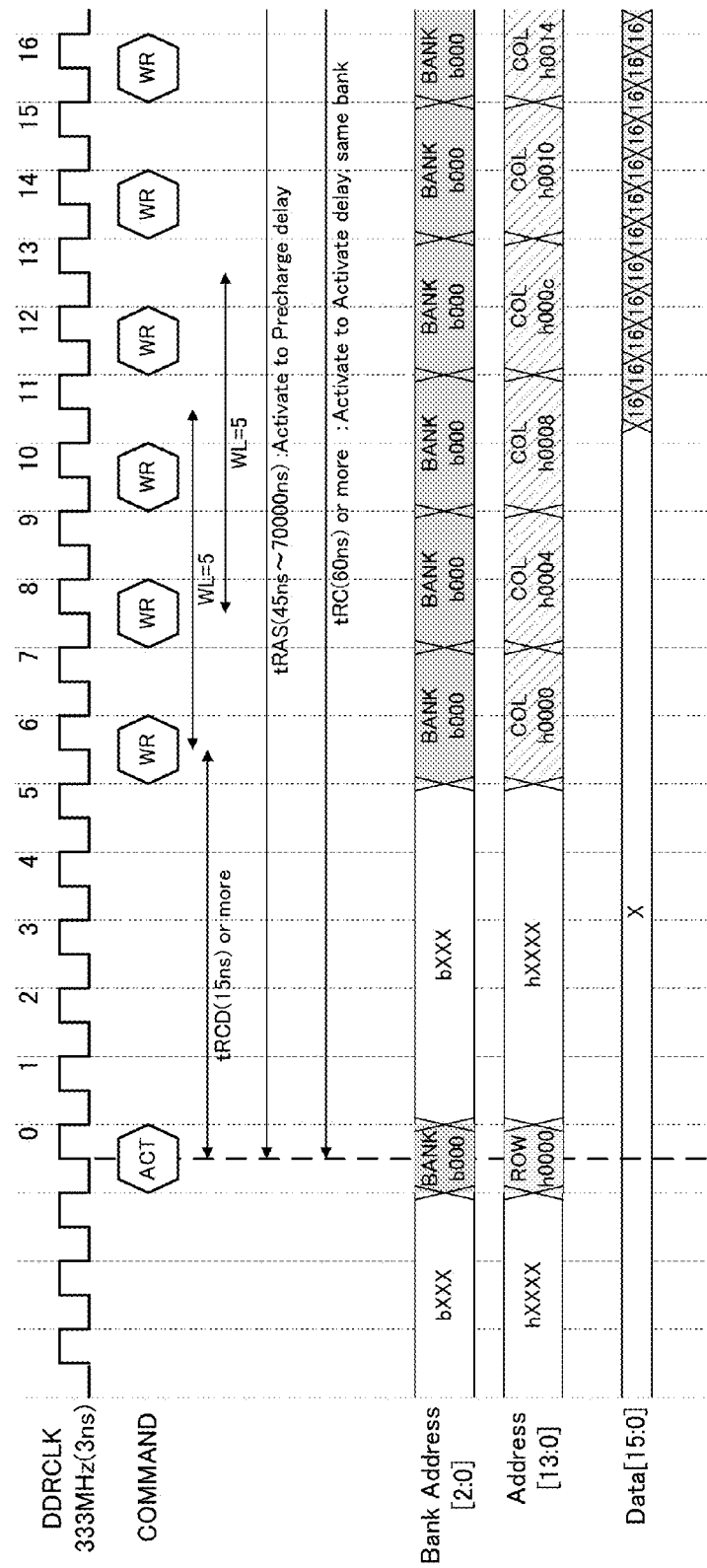
FIGS. 19A and 19B are a view showing the timing chart which indicates the activating timing of the memory in case that one line of the image data in the main scanning direction is written in the SDRAM without changing the sub-scanning address as shown in FIG. 18.
Figure 19B:
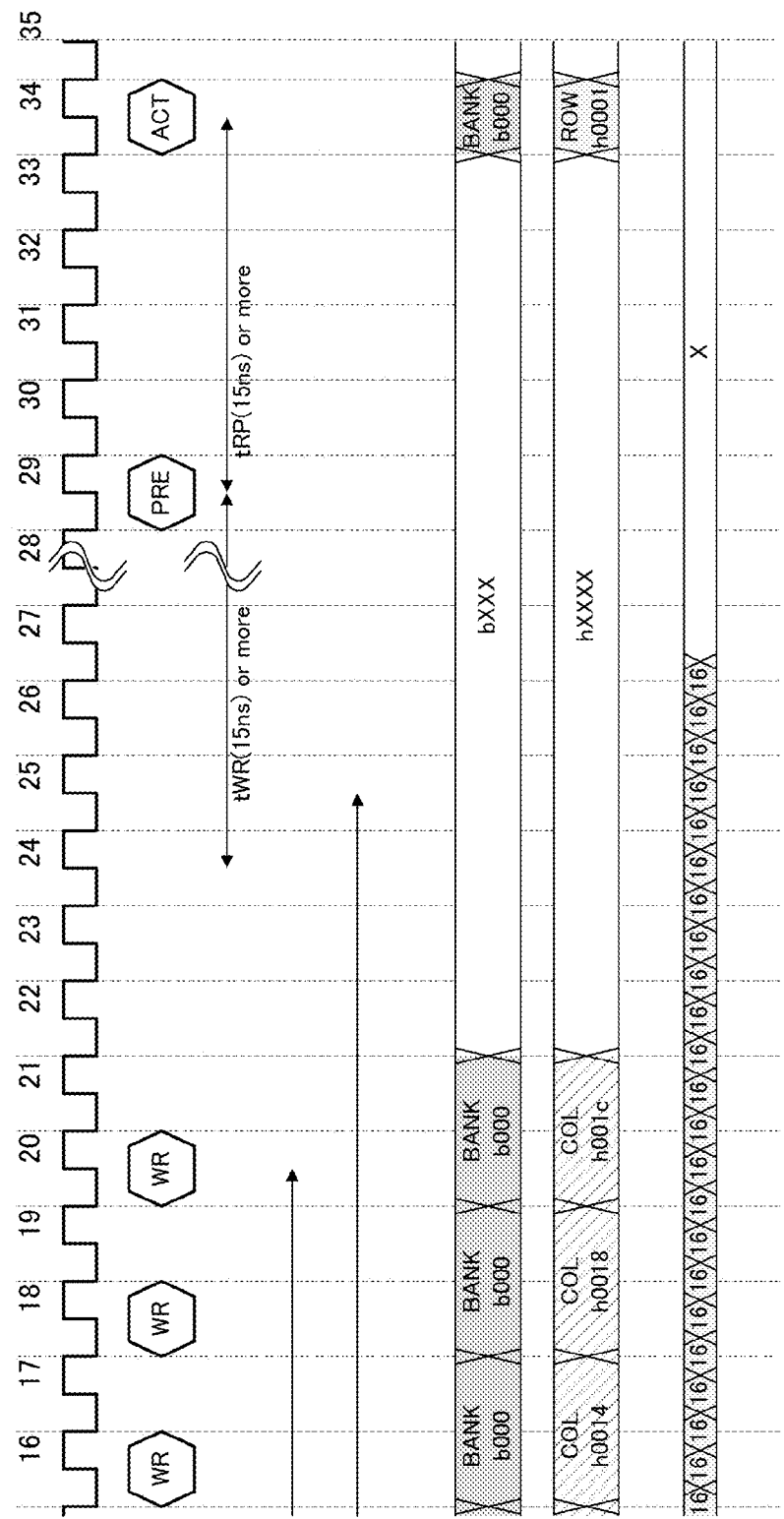
Figure 20:
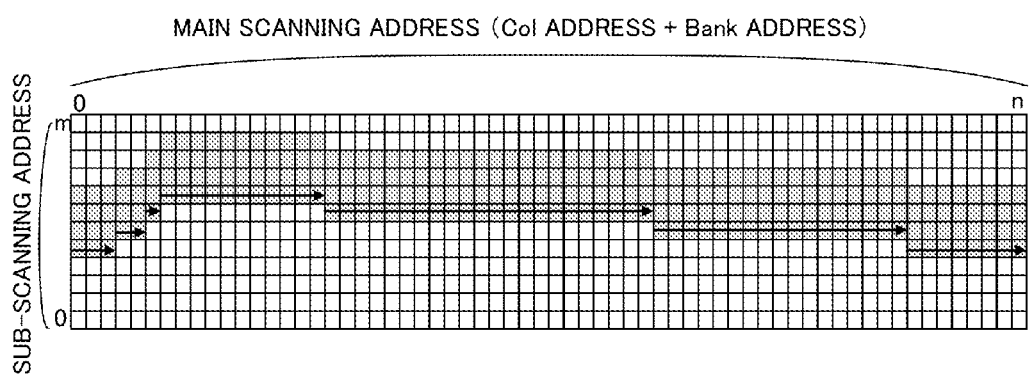
FIG. 20 is a view showing an example in which one line of the image data in the main scanning direction is written while the writing position is shifted in the sub-scanning direction at the end of the block.
Figure 21A:
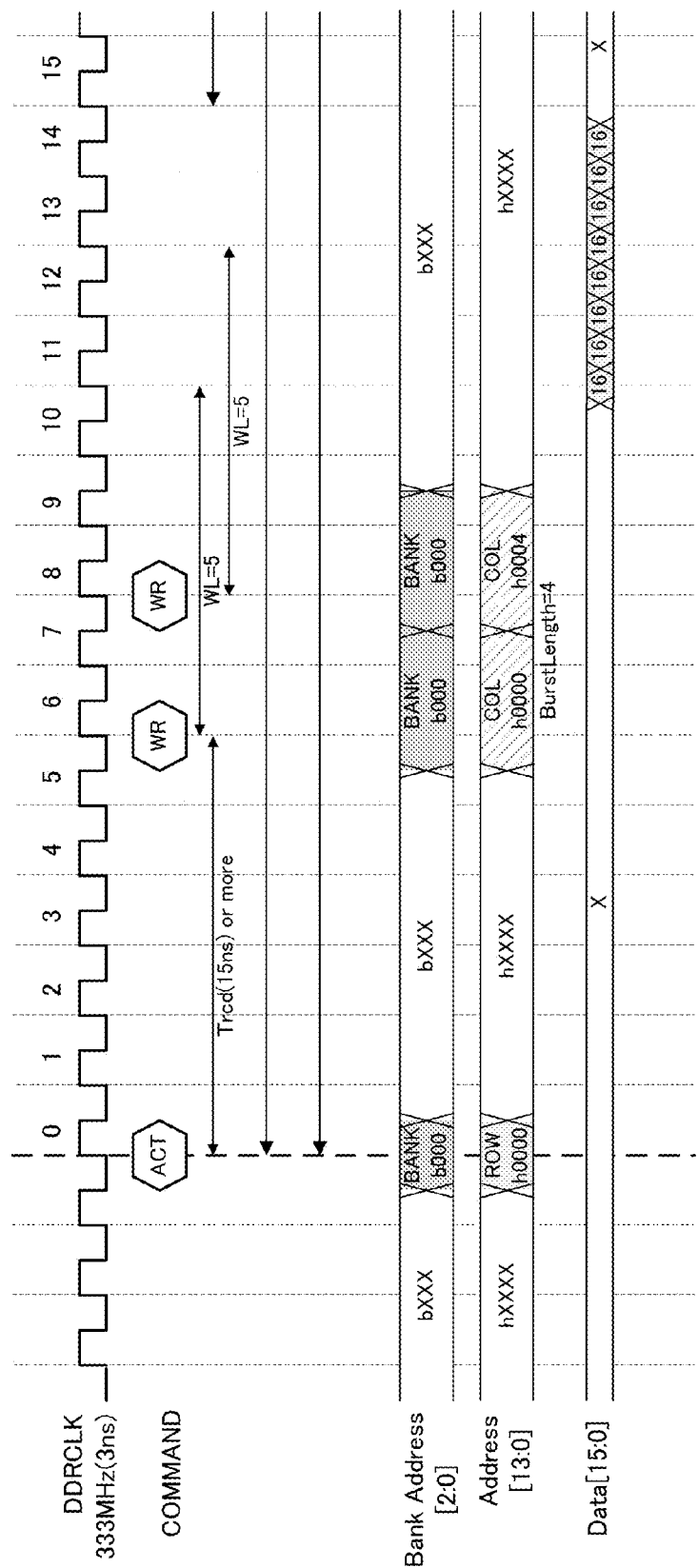

FIGS. 11A and 11B show the activating timing of the memory in case that the memory is accessed by the multibank operation. During the burst transfer to one bank, the ACT command for another bank is output to activate the bank. When the image data is written to the next line on the sub-scanning line in order to correct the skew/bow, the excess overhead time is absorbed by setting the next line to not the different row address, but another bank address.

In the first type, the burst size in the reading of the image data from the memory is the same as the burst size in the writing of the image data in the memory.

<Second Type>

FIG. 12 shows the second type of address mapping. In the upper portion of FIG. 12, the sub-scanning address and the main scanning address which are generated by the front HV count VV count 62 or the rear HV count VV count 65 shown in FIG. 7, are shown. The lower portion of FIG. 12 shows the bits to which the addresses shown in the upper portion of FIG. 12 are assigned in the signal to be output to the memory. In FIG. 12, the lower N bits (N is a positive integer and in case of this example, N is 2) for indicating the address corresponding to the burst size among the main scanning address, to the lower bits of the column address. The predetermined number of bits (in case of this example, 3 bits) which are arranged successively to the upper bit side of the above lower N bits among the main scanning address, are arranged to the bank address. The sub-scanning address is assigned to the row address.

In detail, the bits [0-1] of the main scanning address are assigned to the bits [0-1] of the column address of the memory. The bits [2-4] of the main scanning address are assigned to the bits [0-2] of the bank address of the memory. The bits [5-12] of the main scanning address are assigned to the bits [2-9] of the column address of the memory. Further, the bits [0-12] of the sub-scanning direction are assigned to the bits [0-12] of the row address. That is, the address selector 63 and the address selector 66 have the function as the address mapping unit for assigning the main scanning address indicating the pixel position in the main scanning direction of the two-dimensional image in which the pixels are arranged in the main scanning direction and in the sub-scanning direction, and the sub-scanning address indicating the pixel position in the sub-scanning direction, to the column address, the row address and the bank address of the PC-interval delay memory 20. Further, in the second type, each of the address selector 63 and the address selector 66 assigns the lower N bits (in case of this example, 2) for indicating the address corresponding to the burst size among the main scanning address, to the lower bits [0-1] of the column address. Each of the address selector 63 and the address selector 66 assigns the predetermined number of bits (in case of this example, 3 bits) which are arranged successively to the upper bit side of the above lower N bits among the main scanning address, to the bank address [0-2]. Further, the bit [13] of the sub-scanning address is assigned to the chip select. The bit [14] of the sub-scanning address is not used.

When the address assignment (mapping) is carried out as described above, the bank address is changed every when the main scanning address is increased by "4". As described above, even though the bank is changed in the multibank operation, the overhead is hardly caused. At the same time, the row address can be changed. Therefore, even though the line position in the sub-scanning direction (row address) is changed in every burst transfer in order to correct the skew/bow, that is, because one line of the image data in the main scanning direction is read or written by carrying out the burst transfer successively multiple times in the multibank operation while the address control circuit 58 and the memory controller 44 as the access executing unit change the sub-scanning address at the end of the burst transfer, it is possible to suppress the overhead and carry out the skew/bow correction.

Like the first type, the burst size is set in accordance with the minimum number (referred to as the amount of alignment) of the successive pixels in the main scanning direction, which are shifted in the sub-scanning direction by the same shift amount when the skew/bow is corrected. In this example, because the data width for storing the data having four pixels (2×2 pixels packing) is provided for one address, the amount of alignment is 16 pixels. The skew/bow correction can be carried out by changing the position in the sub-scanning direction by the unit of 16 pixels which are arranged successively in the main scanning direction.

The contents of the skew correction, which are shown in the upper portion of FIG. 12, are set as the skew correction data. For example, as the skew correction data, each shift amount of the blocks in the sub-scanning direction, which are arranged in the main scanning direction from the leading data to the trailing data, is registered. The front HV count VV count 62 shifts the sub-scanning address in accordance with the skew correction data.

FIG. 13 shows the positions of the image data on the memory and the contents of the burst transfer for writing the data in the memory, in case that one line of the image data in the main scanning direction is written while the line position is moved in the sub-scanning direction according to the address mapping shown in FIG. 12, in order to correct the skew/bow. Each box (block) shown in FIG. 13 is equivalent to the area having one pixel in the sub-scanning direction and the burst length in the main scanning direction (in this example, 16 pixels). The above block indicates the minimum unit of the burst transfer.

The situation in which the blocks are shifted in the sub-scanning direction is the same as that shown in FIG. 10. The bank address is changed for every block. In this example, because the sub-scanning address is changed from the block 1 to the block 7, the row address is changed. However, because the bank address is changed by the multibank operation in every burst transfer, the overhead is hardly caused even though the sub-scanning address is changed.

In the second type, the change of the bank is necessarily caused every when the burst transfer having the burst length corresponding to the amount of alignment is carried out. Unlike in case of the first type, the circuit or the processing for judging whether the sub-scanning address is changed when the image data is written to the next block in the main scanning direction, is not required. On the other hand, because the burst transfer cannot be carried out successively in the main scanning direction, the improvement in the performance of the image forming apparatus is limited.

In the second type, the burst size in the reading of the image data from the memory is the same as the burst size in the writing of the image data in the memory.

<Third Type>

FIG. 14 shows the third type of address mapping. In the upper portion of FIG. 14, the sub-scanning address and the main scanning address which are generated by the front HV count VV count 62 or the rear HV count VV count 65 shown in FIG. 7, are shown. The lower portion of FIG. 14 shows the bits to which the addresses shown in the upper portion of FIG. 14 are assigned in the signal to be output to the memory. In FIG. 14, like the second type, the main scanning address is assigned to the bank address. However, in the third type, the main scanning address is assigned by dividing the bank address into two portions. The third type corresponds to the case in which the writing of the image data is different from the reading of the image data in the burst length, that is, the burst size in the reading of the image data from the memory is different from the burst size in the writing of the image data in the memory.

That is, the address selector 63 and the address selector 66 assign the predetermined number of bits (for example, 2 bits) which are arranged successively to the upper bit side of the lower n bits (n is a positive integer) for indicating the address corresponding to the burst size in the writing of the image data among the main scanning address, to the bits which are a part of the bank address. Further, the address selector 63 and the address selector 66 assign the predetermined number of bits (for example, 1 bit) which are arranged successively to the upper bit side of the lower m bits (m is a positive integer which is different from n) for indicating the address corresponding to the burst size in the reading of the image data among the main scanning address, to the bits which are the other part of the bank address.

In this example, the integer n is set to 4, the integer m is set to 10 and 3 bits of the bank address is used by dividing the 3 bits into 2 bits and 1 bit. In detail, the bits [0-3] of the main scanning address are assigned to the bits [0-3] of the column address of the memory. The bits [4-5] of the main scanning address are assigned to the bits [0-1] of the bank address. The bits [6-9] of the main scanning address are assigned to the bits [4-7] of the column address of the memory. The bit [10] of the main scanning address is assigned to the bit [2] of the bank address. The bits [11-12] of the main scanning address are assigned to the bits [8-9] of the column address of the memory. Further, the bits [0-12] of the sub-scanning address are assigned to the bits [0-12] of the row address. The bit [13] of the sub-scanning address is assigned to the chip select. The bit [14] of the sub-scanning address is not used.

When the address assignment (mapping) is carried out as described above, the bank address is changed every when the main scanning address is increased by "16". Further, the bank address is changed every when the tenth bit of the main scanning address is changed. For example, it is possible to set the burst size in the writing of the image data so as to change the bank address every when the main scanning address is increased by "16", and to set the burst size in the reading of the image data so as to change the bank address every when the tenth bit of the main scanning address is changed.

As described above, even though the bank is changed in the multibank operation, the overhead is hardly caused. At the same time, the row address can be changed. Therefore, even though the line position in the sub-scanning direction (row address) is changed in every burst transfer in order to correct the skew/bow, it is possible to suppress the overhead and carry out the skew/bow correction.

The third type has the same characteristics as the second type. Further, in the third type, the burst length in the writing of the image data and the burst length in the reading of the image data, can be set separately.

As described above, in the image forming apparatus 10 according to the embodiment, the address mapping which is used when the image data is written in the PC-interval delay memory 20 and is read from the PC-interval delay memory 20, is set so as to necessarily change the bank at the timing at which the change of the sub-scanning address is required in the skew/bow correction. Further, in the address mapping, the bank is changed by the multibank operation. Therefore, the skew/bow correction can be carried out by changing the sub-scanning address without causing the overhead, for example, the precharge.

Therefore, even though the skew/bow correction is carried out by using the PC-interval delay memories 20 in which the time for writing or reading one line of the image data is limited in order to ensure the performance of the image forming apparatus, it is possible to write and read the image data within the finite period of time and to reduce the amount of alignment. Further, it is possible to precisely carry out the skew/bow correction.

The address mapping can be suitably changed by setting the address selectors 63 and 66. In case that the lower N bits for indicating the address corresponding to the burst size among the main scanning address are assigned to the lower bits of the column address, the integer N is changeable by arbitrarily setting the integer N. In accordance with the changed N, the actual burst size is changed. The setting of the integer N is carried out by setting the parameter to the image processing circuit 21 including the PC-interval delay control circuit 43 by the CPU 11.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

The address mapping shown in the embodiment is illustrated by an example. The address mapping is not limited to the embodiment. For example, in the second type, the burst length may be set in accordance with the required amount of alignment, and the position of the bit which is assigned to the bank address may be set in accordance with the set burst length. For example, in case that the burst length is "8", one or several bits from the lower fourth bit of the main scanning address may be assigned to the bank address.

The SDRAM which can be used in the embodiment is not limited to the DDR-SDRAM. The memory in which one bank can be activated during the burst transfer to another bank, can be used.

As long as at least one of the first to the third types shown in the embodiment can be used, it is not required that the type to be used can be changed among the above three types.

In the embodiment, the LDs (laser diodes 33Y, 33M, 33C and 33K) are used as the exposure device. However, the image may be scanned by an LED array. Further, the image forming apparatus is not limited to the electrophotographic type of image forming apparatus. The present embodiment can be applied to another type of image forming apparatus, such as the inkjet type of image forming apparatus.

The circuit shown in the embodiment is illustrated by an example. As long as the necessary functions are realized, another circuit structure may be used.

In the embodiment, the PC-interval delay memories 20 are used for the skew/bow correction. However, the skew/bow correction may be carried out by writing or reading the image data in/from a memory which is separately prepared. For example, the skew correction may be carried out by using a page memory.

One of the objects of the above embodiment is to provide a memory control device and an image forming apparatus which can suppress the overhead, for example, the precharge and the like, even though the burst length is shortened in the burst transfer which is carried out when the skew/bow correction is carried out by shifting the writing or reading position in the sub-scanning direction on the SDRAM.

In the embodiment, the bank address is changed in every burst transfer when one line of the image data in the main scanning direction is read or written. When the burst transfer is successively carried out by the multibank operation, the row address can be changed in every burst transfer without causing the precharge between the current burst transfer and the next burst transfer. As a result, even though the sub-scanning address is assigned to the row address of the memory, it is possible to change the sub-scanning address in every burst transfer without causing the precharge. Therefore, it is possible to slightly incline the image or to correct the skew/bow in the image by reading the image data from the memory or writing the image data in the memory without deteriorating the performance for accessing to the memory.

In this embodiment, the memory control device has the function for correcting the skew/bow in the image by shifting the pixel in the sub-scanning direction. Further, the burst size (burst length) is set in accordance with the minimum number of the successive pixels in the main scanning direction, which are shifted by the same shift amount when the skew/bow is corrected. For example, in case that the SDRAM having the data width for writing the image data having four pixels in one address is used, when the minimum number of the successive pixels is 16, the burst size (burst transfer) is 4. The number N of bits, which corresponds to the above burst size is 2.

In this embodiment, the number N can be changed in accordance with the required precision of the correction.

In this embodiment, the bank address is divided in the bit position corresponding to the burst size in the reading of the image data and in the bit position corresponding to the burst size in the writing of the image data. The integer m (burst length in the reading of the image data) may be larger or smaller than the integer n (burst length in the writing of the image data).

In this embodiment, the lower bits of the sub-scanning address are assigned to the bank address. In the range in which the lower bits of the sub-scanning address is assigned to the bank address, even though the sub-scanning address is changed in every burst transfer, the burst transfer is successively carried out by the multibank operation, and it is possible to suppress the overhead which is the precharge. Therefore, it is possible to slightly incline the image or to correct the skew/bow in the image by reading the image data from the memory or writing the image data in the memory.

In this embodiment, even though the sub-scanning address is changed, the overhead, for example, the precharge and the like, is hardly caused. Therefore, the drum-interval delay memory in which the performance of the image forming apparatus is required can be used as the image memory for shifting the image data in the sub-scanning direction in the skew/bow correction or the like.

In this embodiment, it is possible to ensure the performance of the image forming apparatus and to correct the skew/bow caused in the image forming unit, by using the drum-interval delay memory.

According to the memory control device and the image forming apparatus, it is possible to carry out the burst transfer in which the overhead, for example, precharge and the like is suppressed, even though the burst length is shortened in case that the skew/bow or the like in the image is corrected by reading the image data from the memory or writing the image data in the memory. Therefore, even in case that the processing time is limited, the skew/bow correction can be precisely carried out by shortening the burst length.

The present U.S. patent application claims the priority of Japanese Patent Application No. 2013-50738, filed on Mar. 13, 2013, according to the Paris Convention, and the entirety of which is incorporated herein by reference for correction of incorrect translation.

What is claimed is:

1. A memory control device, comprising:
    an address mapping unit configured to assign a main scanning address indicating a pixel position in a main scanning direction of a two-dimensional image in which pixels are arranged in the main scanning direction and in a sub-scanning direction which is perpendicular to the main scanning direction in a matrix form, and a sub-scanning address indicating the pixel position in the sub-scanning direction, to a column address, a row address and a bank address of an SDRAM; the address mapping unit assigning lower N bit(s) for indicating an address corresponding to a burst size of a burst transfer among the main scanning address, to lower bit(s) of the column address, and assigning predetermined number of bit(s) arranged successively to an upper bit side of the lower N bit(s) among the main scanning address, to the bank address; and an access executing unit configured to read or write one line of image data in the main scanning direction by carrying out the burst transfer successively multiple times in a multibank operation while the sub-scanning address is changed at an end of the burst transfer, wherein the N is a positive integer.

2. The memory control device of claim 1, wherein the memory control device corrects a skew in the two-dimensional image, a bow in the two-dimensional image or both of the skew and the bow by shifting the pixels in the sub-scanning direction, and the burst size is set in accordance with minimum number of the pixels arranged successively in the main scanning direction, which are shifted by a same shift amount when the skew or the bow is corrected.

3. The memory control device of claim 1, wherein the N is changeable by arbitrarily setting the N.

4. The memory control device of claim 1, wherein the burst size in reading of the image data from the SDRAM is same as the burst size in writing of the image data in the SDRAM.

5. The memory control device of claim 1, wherein the burst size in reading of the image data from the SDRAM is different from the burst size in writing of the image data in the SDRAM.

6. The memory control device of claim 5, wherein the address mapping unit assigns lower n bit(s) for indicating the address corresponding to the burst size in the writing of the image data among the main scanning address, to bit(s) which are a part of the bank address, the n being a positive integer, the address mapping unit assigns bit(s) arranged successively to an upper bit side of lower m bit(s) for indicating the address corresponding to the burst size in the reading of the image data among the main scanning address, to bit(s) which are another part of the bank address, the m being a positive integer which is different from the n.

7. A memory control device, comprising:

an address mapping unit configured to assign a main scanning address indicating a pixel position in a main scanning direction of a two-dimensional image in which pixels are arranged in the main scanning direction and in a sub-scanning direction which is perpendicular to the main scanning direction in a matrix form, and a sub-scanning address indicating the pixel position in the sub-scanning direction, to a column address, a row address and a bank address of an SDRAM; the address mapping unit assigning lower N bit(s) for indicating an address corresponding to a burst size of a burst transfer among the main scanning address, to lower bit(s) of the column address, and assigning lower bit(s) of the sub-scanning address to the bank address; and an access executing unit configured to read or write one line of image data in the main scanning direction by carrying out the burst transfer successively multiple times in a multibank operation while a value of the lower bit(s) of the sub-scanning address is changed at an end of the burst transfer, wherein the N is a positive integer.

8. The memory control device of claim 7, wherein the memory control device corrects a skew in the two-dimensional image, a bow in the two-dimensional image or both of the skew and the bow by shifting the pixels in the sub-scanning direction, and the burst size is set in accordance with minimum number of the pixels arranged successively in the main scanning direction, which are shifted by a same shift amount when the skew or the bow is corrected.

9. The memory control device of claim 1, wherein the SDRAM is a drum-interval delay memory which is provided in a tandem type of image output apparatus.

10. The memory control device of claim 7, wherein the SDRAM is a drum-interval delay memory which is provided in a tandem type of image output apparatus.

11. An image forming apparatus, comprising:

a tandem type of image forming unit configured to form a two-dimensional image by repeating an image forming operation in a main scanning direction line by line while an image forming position is moved in a sub-scanning direction;

an SDRAM used as a drum-interval delay memory of the image forming unit; and the memory control device of claim 2, which is configured to control writing of the image data in the SDRAM and reading of the image data from the SDRAM, wherein the image data to be output is output to the image forming unit via the SDRAM, and the image data is corrected so as to cancel the skew or the bow or both of the skew and the bow in the image output by the image forming unit, by shifting the pixel position in the sub-scanning direction by the memory control device while the image data passes through the SDRAM.

12. An image forming apparatus, comprising:

a tandem type of image forming unit configured to form a two-dimensional image by repeating an image forming operation in a main scanning direction line by line while an image forming position is moved in a sub-scanning direction;

an SDRAM used as a drum-interval delay memory of the image forming unit; and the memory control device of claim 8, which is configured to control writing of the image data in the SDRAM and reading of the image data from the SDRAM, wherein the image data to be output is output to the image forming unit via the SDRAM, and the image data is corrected so as to cancel the skew or the bow or both of the skew and the bow in the image output by the image forming unit, by shifting the pixel position in the sub-scanning direction by the memory control device while the image data passes through the SDRAM.

* * * * *